United States Patent
Simari et al.

(10) Patent No.: US 10,665,028 B2
(45) Date of Patent: May 26, 2020

(54) MOBILE PERSISTENT AUGMENTED-REALITY EXPERIENCES

(71) Applicant: Facebook, Inc., Menlo Park, CA (US)

(72) Inventors: Matthew Adam Simari, Seattle, WA (US); Alvaro Collet Romea, Seattle, WA (US); Krishnan Kumar Ramnath, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/100,126

(22) Filed: Aug. 9, 2018

(65) Prior Publication Data

US 2019/0371067 A1 Dec. 5, 2019

Related U.S. Application Data

(60) Provisional application No. 62/680,504, filed on Jun. 4, 2018.

(51) Int. Cl.
| | |
|---|---|
| *G06T 19/00* | (2011.01) |
| *G06T 7/73* | (2017.01) |
| *G06T 19/20* | (2011.01) |
| *G06Q 50/00* | (2012.01) |

(52) U.S. Cl.
CPC .............. *G06T 19/006* (2013.01); *G06T 7/75* (2017.01); *G06T 19/20* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2010/0098324 A1* | 4/2010 | Fujieda | B25J 9/1697 382/154 |
| 2011/0279445 A1* | 11/2011 | Murphy | G06F 3/04842 345/419 |
| 2015/0278579 A1* | 10/2015 | Saklatvala | G06K 9/6201 382/203 |
| 2016/0035348 A1* | 2/2016 | Kleindienst | G10L 15/1822 704/235 |
| 2017/0186237 A1* | 6/2017 | Hirota | G06T 7/20 |
| 2017/0199855 A1* | 7/2017 | Fishbeck | G06F 17/241 |
| 2018/0190020 A1* | 7/2018 | Mullins | G06T 19/006 |

* cited by examiner

*Primary Examiner* — Frank S Chen
(74) *Attorney, Agent, or Firm* — Baker Botts L.L.P.

(57) ABSTRACT

In one embodiment, a method includes determining, using one or more location sensors of a computing device, an approximate location of the computing device, identifying a content object located within a threshold distance of the approximate location, wherein an augmented-reality map associates the content object with a stored model of a real-world object and specifies a location of the content object on or relative to the stored model of the real-world object, obtaining an image from a camera of the device, identifying, in the image, a target real-world object that matches the stored model of the real-world object, determining a content object location based on a location of the target real-world object and the location of the content object on or relative to the model of the real-world object, and displaying the content object at the content object location.

20 Claims, 11 Drawing Sheets

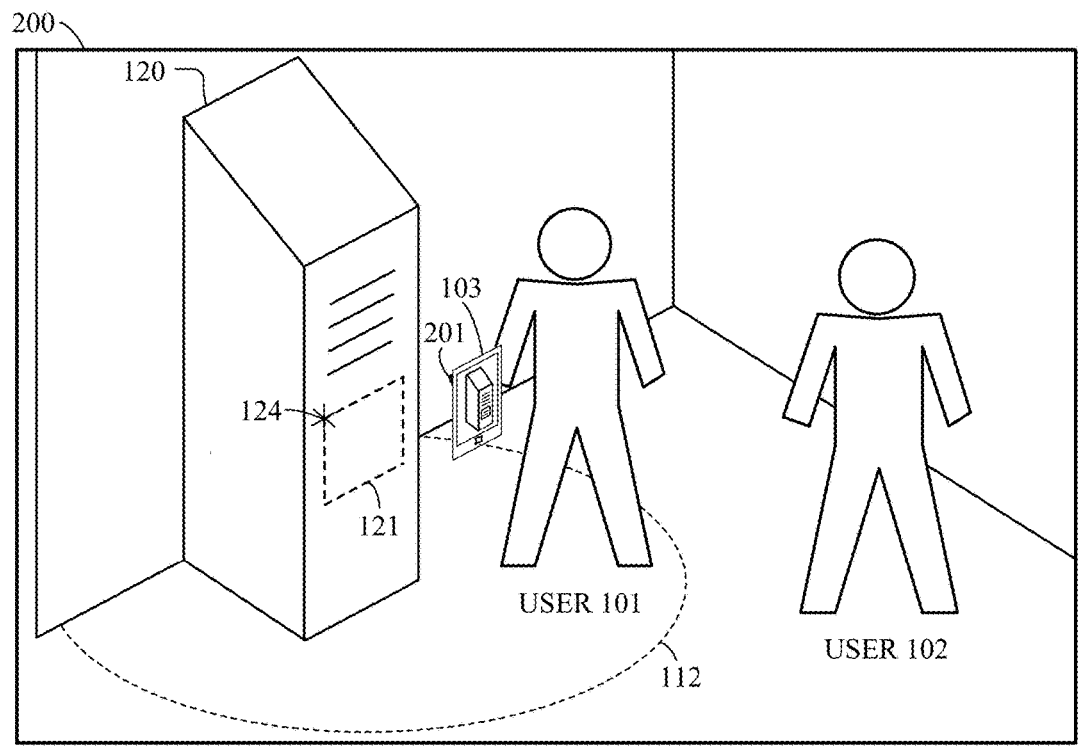
FIG. 2A
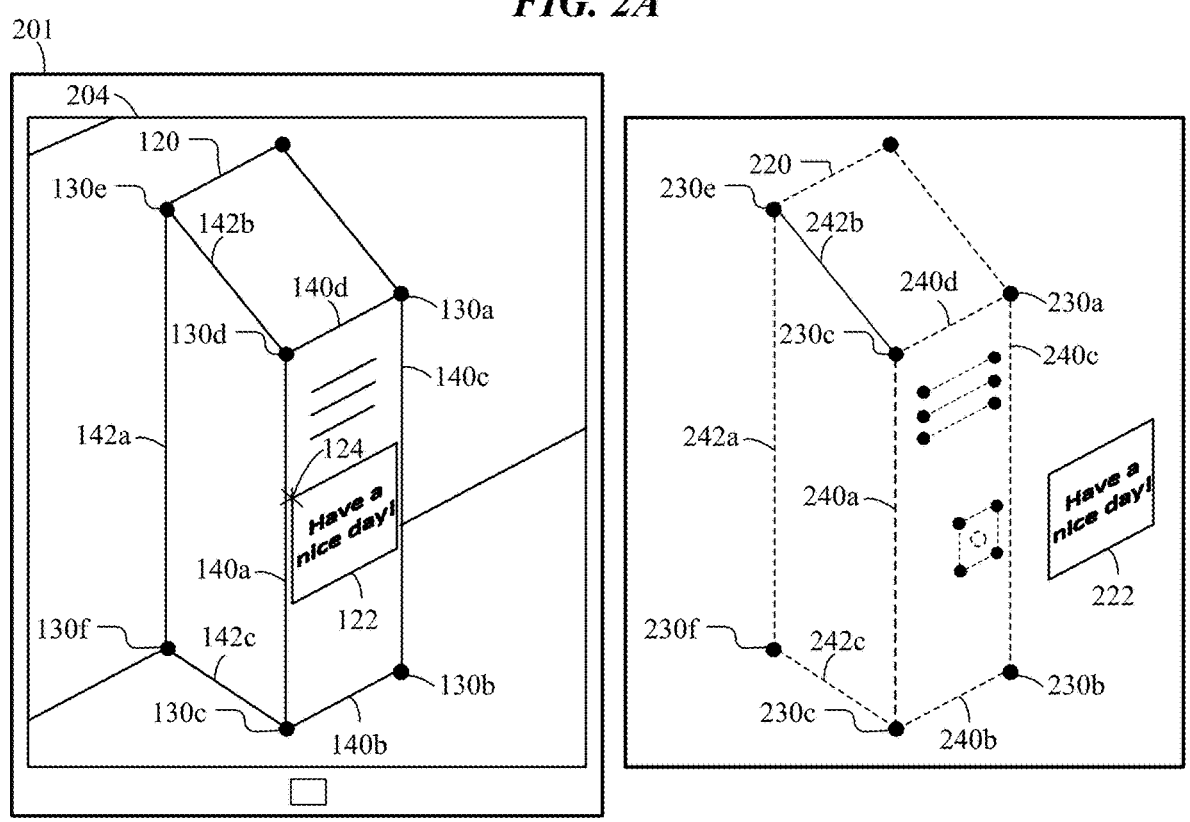
FIG. 2B
FIG. 2C

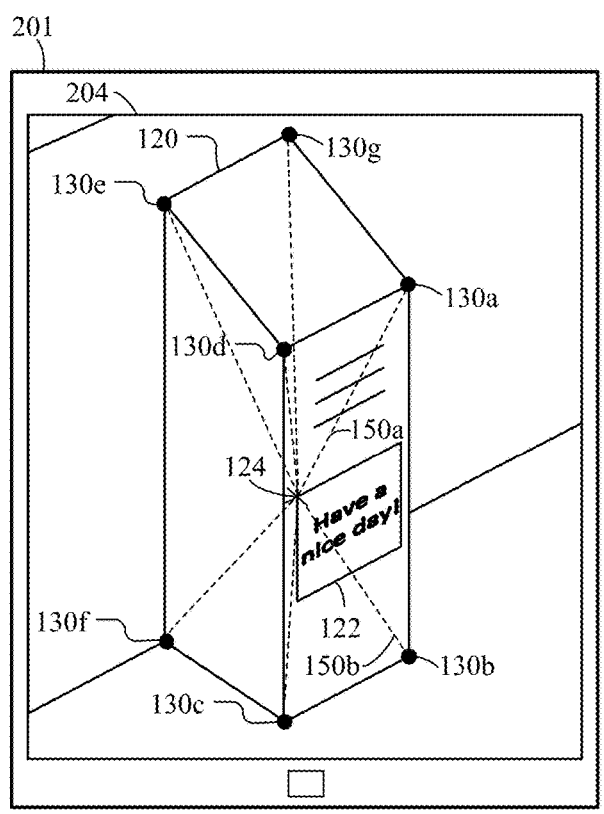 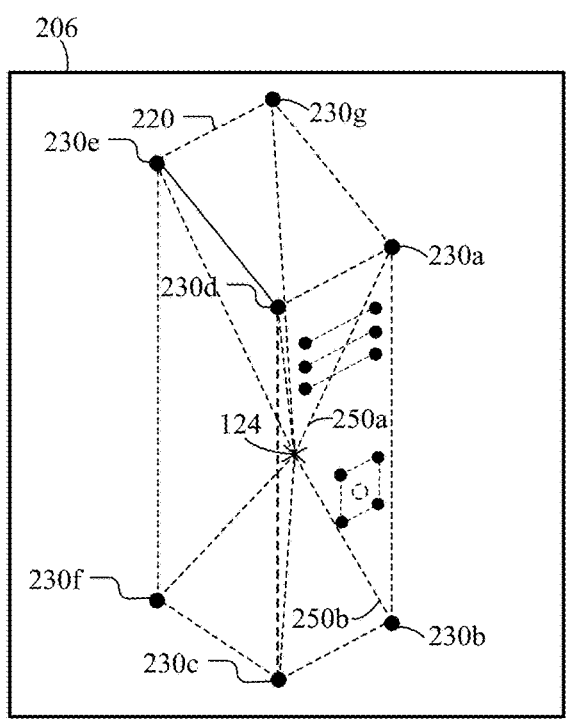
*FIG. 2D*  *FIG. 2E*

MOBILE PERSISTENT AUGMENTED-REALITY EXPERIENCES

PRIORITY

This application claims the benefit, under 35 U.S.C. § 119(e), of U.S. Provisional Patent Application No. 62/680,504, filed 4 Jun. 2018, which is incorporated herein by reference.

TECHNICAL FIELD

This disclosure generally relates to augmented reality environments, and in particular to systems and methods for presenting augmented-reality content at particular locations.

BACKGROUND

Augmented Reality (AR) effects are computer-generated visual effects (e.g., images and animation) that are superimposed or integrated into a user's view of a real-world scene. Certain AR effects may be configured to track objects in the real world. For example, a computer-generated unicorn may be placed on a real-world table as captured in a video. As the table moves in the captured video (e.g., due to the camera moving or the table being carried away), the generated unicorn may follow the table so that it continues to appear on top of the table. To achieve this effect, an AR application may use tracking algorithms to track the positions and/or orientations of objects appearing in the real-world scene and use the resulting tracking data to generate the appropriate AR effect. Since AR effects may augment the real-world scene in real-time or near real-time while the scene is being observed, tracking data may need to be generated in real-time or near real-time so that the AR effect appears as desired.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Embodiments described herein relate to systems and methods for enabling an Augmented Reality (AR) application to display content, such as text, images, or animation, in association with real-world objects. The content may be displayed at or near the location of the associated real-world objects in a user's view of a real-world scene in an AR application on the user's client system (e.g., mobile device). For example, the displayed content may be superimposed on an image of a real-world object in the scene, or superimposed on a portion of the scene adjacent to or sufficiently near the real-world object so that the content appears to be associated with the object. Displaying content at or near the location of a real-world object may involve determining the location of the real-world object with sufficient accuracy so that the content appears at or near the real-world object.

In particular embodiments, a content object may be associated with a particular real-world object in an AR environment. An AR system may use a positioning system such as GPS or WIFI triangulation to monitor the distance between the location of the user's client system and the location of the real-world object with which the content is associated. When the user's client system is sufficiently close to the real-world object according to the positioning system, the AR system may inform the user that there is content to be viewed nearby, and may ask the user to open the client system's camera to scan for the real-world object. When the camera is opened, a tracking algorithm, such as a Simultaneous Localization and Mapping (SLAM) algorithm, may be used to determine a more accurate location of the user's client system than the location determined by the positioning system, and to determine an accurate location of the real-world object relative to the client system. The content may then be displayed on the client system in association with (e.g., superimposed on) the real-world object. As an example, the real-world object may be a locker in a building such as a school, and the content may be a virtual note placed on the locker. The note may be displayed in AR displays of users who are near the locker. The note may be displayed by, e.g., superimposing it on the locker in the client system's display.

Particular embodiments may generate an augmented-reality (AR) map to represent the real-world environment. The map may be generated using cameras and sensors to map the environment. Users may use their client system cameras to scan their surroundings, and the AR system may use the camera images to create objects in the map that represent the surrounding area. High-accuracy tracking algorithms may determine the client system's location and the locations of real-world objects in the client system's surroundings from the camera and sensors to produce a set of 3D feature points in space. The 3D feature points may be stored in the map, and the map may be uploaded to the server for use by other users. Other users may also add feature points to the map. Each feature point may be associated with a time in addition to a location in the map. Feature points may be associated with information about the real-world objects to which they correspond, such an object type (e.g., building) and name (e.g., "Empire State Building"). The map representations of real-world objects may contain representations of other real-world objects. For example, an Empire State Building object may contain objects that represent doors and desks.

In particular embodiments, the AR map may be used to identify content objects associated with real-world objects located near a user's client system based on the client system's GPS location. The AR map may include one or more models of real-world objects, each of which is associated with one or more feature points, and one or more content objects, each of which is associated with a model of a real-world object. The AR system may monitor the distance between the location of the user's client system according to a positioning system, such as GPS, and the locations of content objects listed in the AR map. Since the number of content objects represented in the AR map may be large, the AR map may be divided into different geographic regions, each of which may be associated with a portion of the AR map, and the AR system may monitor the distance to locations of content objects listed in the region in which the user is located. Each region may correspond to an area such as a city block, a neighborhood, a city, or the like. When the user's client system is sufficiently close to a content object according to the positioning system, the AR system may inform the user that there is content to be viewed nearby. The AR system may use a tracking algorithm such as a SLAM algorithm and the feature points associated with the model of the real-world object in the AR map to determine a location of the real-world object relative to the user's client system by searching images received from the client system's camera for a real-world object that matches the model of the real-world object associated with the content object in the AR map. The content object may then be displayed on the client system in association with (e.g., superimposed on) the real-world object using the determined location information.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 2A illustrates an example real-world scene.

FIG. 2B illustrates an example real-world scene captured within an image or video frame with a superimposed content object.

FIG. 2C illustrates example visual representations of 3D models of real-world objects.

FIG. 2D illustrates a designated location of a content object on a real-world object in relation to feature points.

FIG. 2E illustrates an example of a visual representation of stored offset vectors associated with a 3D object model that specify a designated location of a content object in relation to stored feature points of the model.

DESCRIPTION OF EXAMPLE EMBODIMENTS

Figure 1:
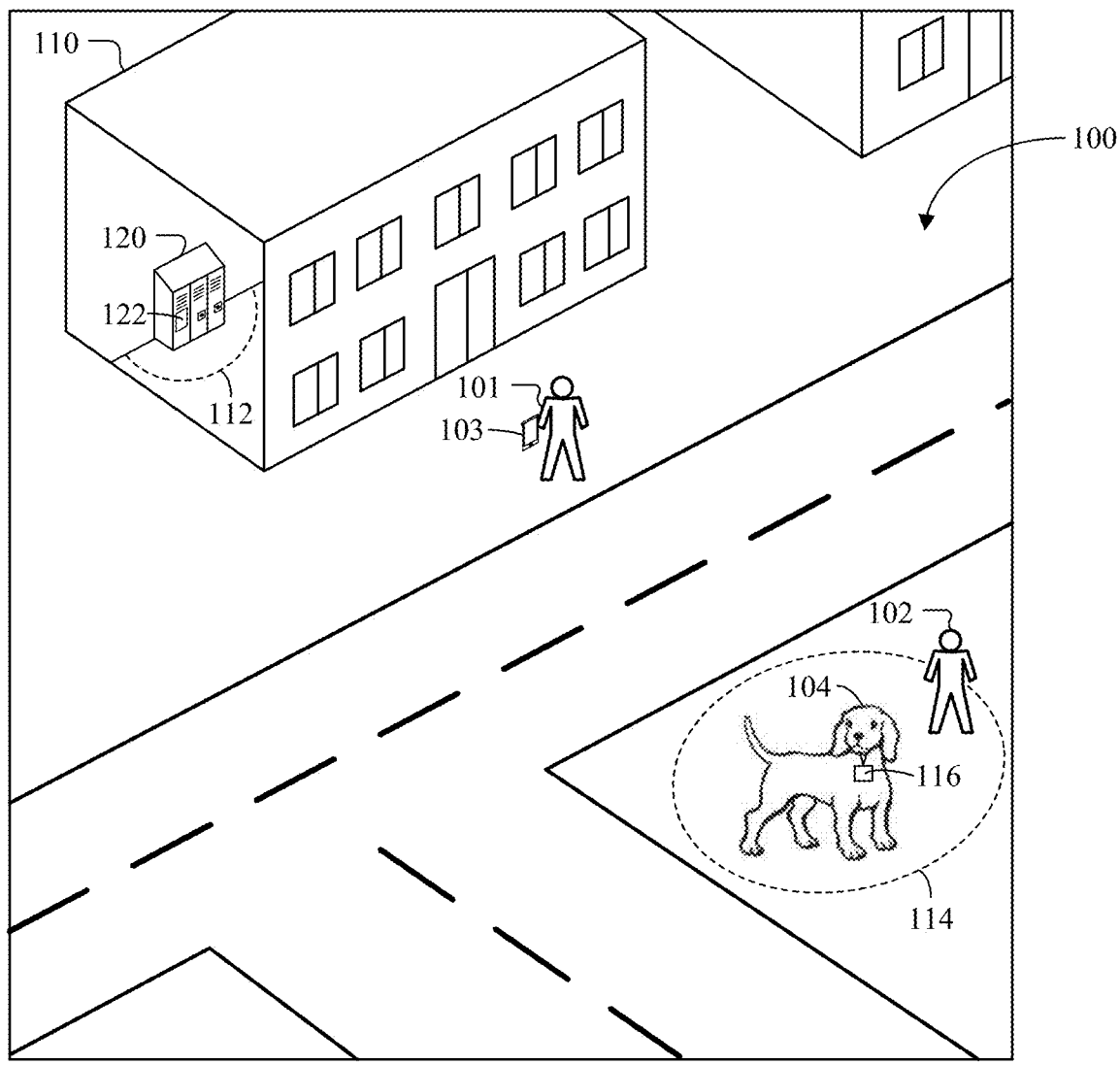
FIG. 1 illustrates an example scene displaying real-world objects and user locations in an augmented-reality environment.

A client system, e.g., a mobile device, can be used to identify and activate augmented reality (AR) experiences at real-world locations. The locations may be identified with a high level of precision. The level of precision may be, for example, greater than that of existing systems such as GPS, WIFI triangulation, and the like. This high level of precision can be achieved by constructing a 3D model of physical objects based on images of the surroundings of the user's client system, such as photos or taken by the client system's camera, and comparing the 3D model of the client system's surroundings to existing 3D models that are associated with known physical locations. The client system's physical location may be identified based on the known locations of 3D models that are similar to the 3D model of the client system's surroundings. For example, if the client system is near a specific locker in a school building, the client system's camera may be used to capture images. A 3D model of the client system's surroundings may be constructed from the images. The 3D model may include features such as the locker and other objects identified in the area surrounding the client system. Each feature may be represented in the model as a set of points that correspond to the feature, e.g., points on the corners and edges of the locker. Physical locations may be associated with the model and the features of the model to a desired degree of accuracy or granularity, so that the client system's physical location may be identified with a similar degree of accuracy or granularity by finding one or more existing 3D models of the client system's surroundings and determining the position of the client system relative to the existing 3D model(s).

Embodiments described herein relate to systems and methods for enabling an Augmented Reality (AR) application to display content, such as text, images, or animation, in association with real-world objects. The content may be displayed at or near the location of the associated real-world objects in a user's view of a real-world scene in an AR application or system. For example, the displayed content may be superimposed on an image of a real-world object in the scene, or superimposed on a portion of the scene adjacent to or sufficiently near a real-world object so that the content appears to be associated with the object. In particular embodiments, displaying content at or near the location of a real-world object may involve determining the location of the real-world object with sufficient accuracy so that the displayed content appears at or near the real-world object. Determining the location of a real-world object with sufficient accuracy may be difficult because of limitations on the accuracy of positioning systems such as GPS or WIFI-based systems. Such positioning systems may be accurate to, for example, 2 meters. Thus, positioning systems may provide insufficient accuracy for displaying AR content at or near objects that are smaller than the systems' accuracy limits. The locations of real-world objects may be obtained with greater accuracy using high-accuracy tracking algorithms such as Simultaneous Localization and Mapping (SLAM). However, high-accuracy tracking algorithms are ordinarily highly computationally-intensive, and can thus be impractical for larger areas.

In particular embodiments, an AR map that includes representations of objects in the real-world environment may be used to identify content objects associated with real-world objects located near a user's client system based on the client system's GPS location. The AR map may include one or more models of real-world objects. Each model of a real-world object may be associated with one or more feature points and/or locations or coordinates, and one or more content objects. Each content object may be associated with a model of a real-world object. The AR system may monitor the distance between the location of the user's client system according to a positioning system such as GPS and the locations of content objects listed in the AR map. Since the number of content objects represented in the AR map may be large, the AR map may be divided into different geographic regions, each of which may be associated with a portion of the AR map. The AR system may monitor the distance to locations of content objects listed in the region in which the user is located. Each region may correspond to an area such as a city block, a neighborhood, a city, or the like. When the user's client system is sufficiently close to a content object according to the positioning system, the AR system may inform the user that there is content to be viewed nearby. The AR system may then use a tracking algorithm, such as a SLAM algorithm, and the feature points associated with the model of the real-world object in the AR map to determine a location of the real-world object relative to the client system by searching images received from the client system's camera for a real-world object that matches the model of the real-world object associated with the content object in the AR map. The content object may then be displayed on the client system in association with (e.g., superimposed on) the real-world object using the determined location information. As an example, the real-world object may be a locker in a building such as a school, and the content may be a virtual note place on the locker. The note may be displayed in AR displays of users who are near the locker. The note may be displayed by, e.g., superimposing it on the locker in the client system's display.

Particular embodiments may generate an augmented-reality map to represent the AR environment. The map may be generated using cameras and sensors to map the environment. Users may use their client system's cameras to scan their surroundings, and the AR system may use the camera images to create objects in the map that represent the surrounding area. High-accuracy tracking algorithms may determine the client system's location and the locations of real-world objects in the client system's surroundings from the camera and sensors to produce a set of 3D feature points in space. The 3D feature points may be stored in the map, and the map may be uploaded to the server for use by other users. Other users may also add feature points to the map. Each feature point may be associated with a time in addition to a location in the map. Feature points may be associated with information about the real-world objects to which they correspond, such an object type (e.g., building) and name (e.g., "Empire State Building"). The map representations of real-world objects may contain representations of other real-world objects. For example, the Empire State Building object may contain objects that represent doors and desks.

In particular embodiments, the AR map may be used to identify content objects associated with real-world objects located near a user's client system based on the client system's GPS (or WIFI, BLUETOOTH, or the like) location, and subsequently to identify the feature points of the real-world objects for use by high-accuracy tracking algorithms. The augmented-reality map may include one or more real-world objects, each of which may be associated with one or more feature points and/or coordinates/locations, and one or more content objects, each of which may be associated with a real-world object. The AR system may monitor the distance between the GPS location of the user's client system and the locations of real-world objects listed in the AR map. When the user's client system is sufficiently close to a real-world object listed in the AR map according to GPS (e.g., the user's GPS location may be within a threshold distance from the coordinates of the real-world object's representation in the AR map), the AR system may inform the user that there is content to be viewed nearby. The AR system may then use a high-accuracy tracking algorithm and the feature points associated with the real-world object in the AR map to determine a more accurate location of the user's client system and an accurate location of the real-world object relative to the client system. The content object associated with the real-world object in the AR map may then be displayed on the client system in association with (e.g., superimposed on) the real-world object.

FIG. 1 illustrates an example scene 100 displaying real-world objects and user locations in an augmented-reality environment. The scene 100, which may be augmented with virtual content by an augmented reality (AR) application on a client system 103, includes images of real-world objects, such as a school building 110 and a dog 104. The images of the real-world objects may be from images or video frames captured by a camera, for example. The users 101, 102 represent users of the AR application. A first user 101 is located in front of the school 110 and second user 102 is located near the dog 104. The AR application on the client system 103 of the first user 101 may display a scene from the point of view of the location at which the first user 101 is standing and in the direction the first user 101 is facing. Similarly, the AR application on a client system of the second user 102 may display a scene from the point of view of the location at which the second user 102 is standing and in the direction the second user 102 is facing.

A portion of the interior of the school building 110 is shown for illustrative purposes. The interior of the building 110 includes a real-world object 120 (e.g., a school locker). A content object 122, e.g., a virtual note on which a message may be written and displayed, is attached to or otherwise associated with the real-world object 120. For example, the second user may have used the AR application to create the note and indicate that the note is to be attached to the locker. The AR application may associate the note at a specific point or region on the locker, and the user may designate the specific point or region. The content object 122 may have been attached to the locker by a user in the AR environment.

The content object 122 is an example content object, and may contain content such as text, images, video, or the like. Although the example real-world object 120 is a locker, content objects 122 may be attached to or otherwise associated with any real-world object that can be recognized by tracking algorithms such as SLAM algorithms or image-based algorithms. For example, the real-world object 120 may be a two-dimensional logo, a menu, a movie poster, a sports field, an animal, and so on. In the sports field example, a user may be at the Seattle Seahawks stadium during a game. The user may open their camera and point it at the field. The field may be recognized as the Seattle Seahawks field, and holographic highlights from, for example, the previous year's Super Bowl, may be presented so that the user may visualize the highlights on the field.

Figure 3A:
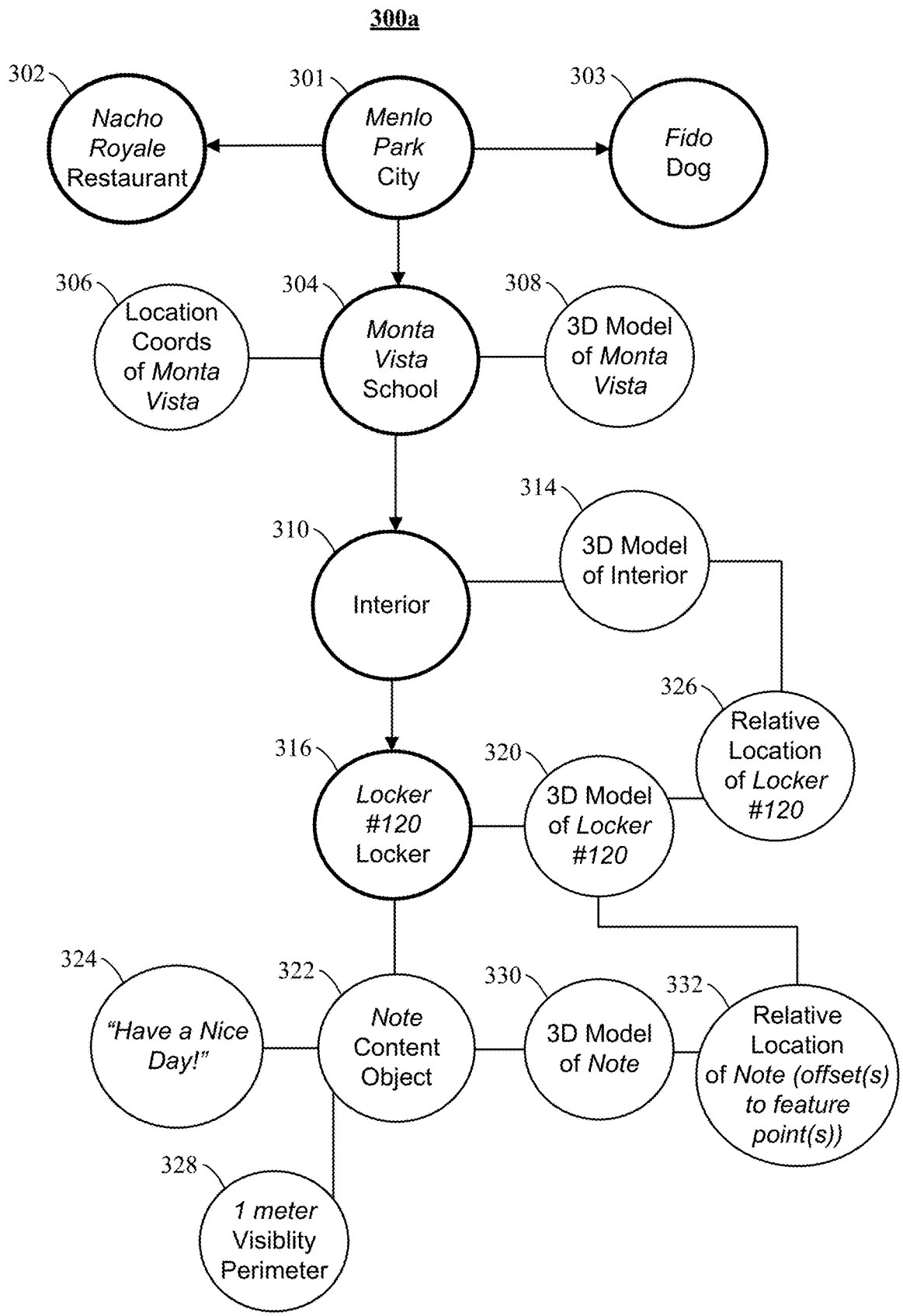
FIGS. 3A-3C illustrate example augmented-reality maps.
Figure 6:
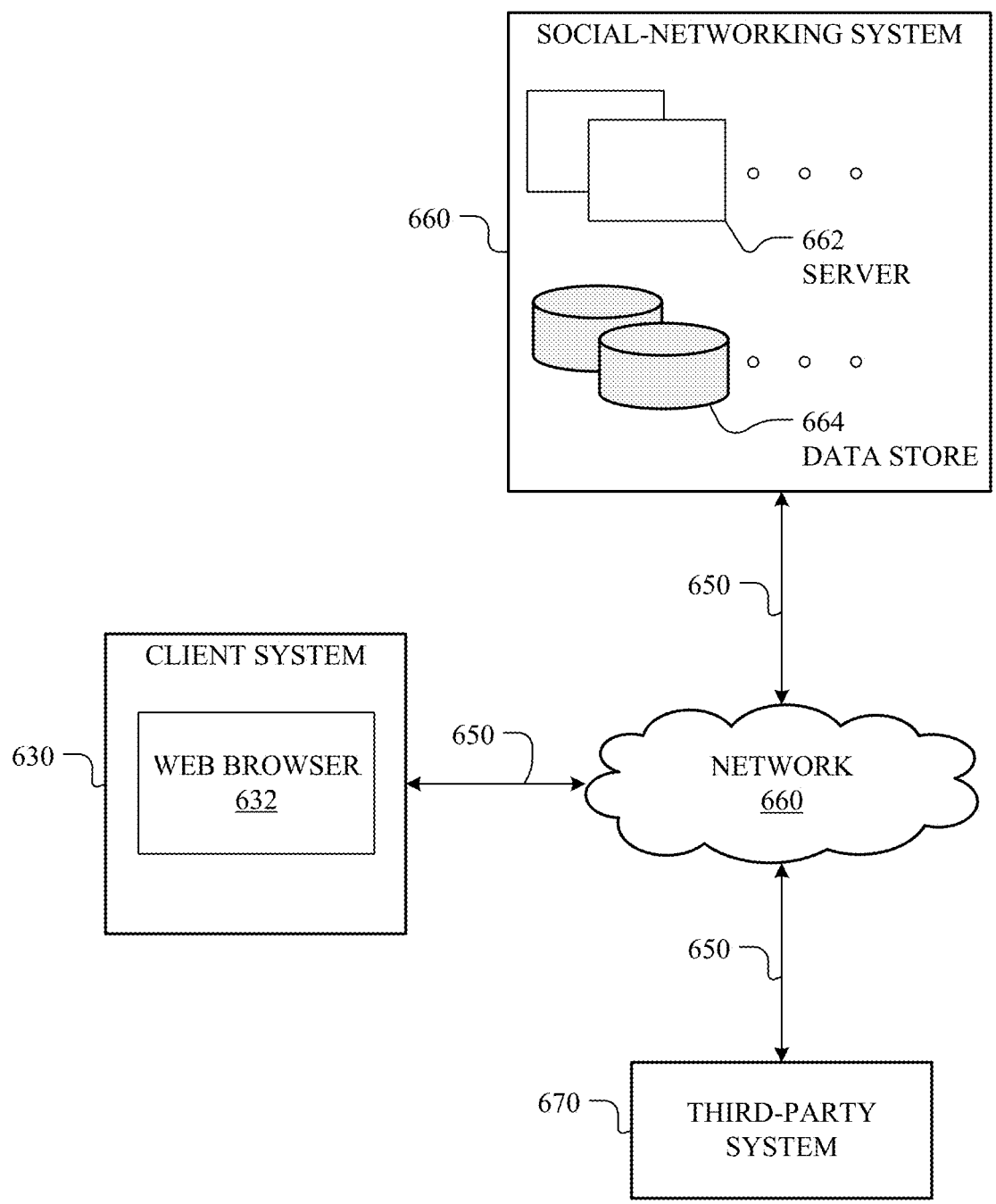
FIG. 6 illustrates an example network environment.

When a user moves into a geographic region near a content object 122, the AR application may determine whether the content object is to be displayed to the user and, if so, display the content object to the user. As described above, since the number of real-world objects represented in the AR map may be large, the AR map may be divided into different geographic regions, each of which may be associated with a portion of the AR map, and the AR system may monitor the distance to locations of real-world objects listed in the region in which the user is located. The AR map may be represented by a graph of nodes as shown in FIG. 3A. Referring to FIG. 6, the AR map 300 may be stored on a server 662 of a social-networking system 660, e.g., in a data store 664. A client system 630 may access the AR map 300 via a network 660. As an example, a city node 301 in the AR map 300 may represent the city of Menlo Park, and the city node 301 may be connected by a directed edge to a node 304 that represents the school. The directed edge indicates that the school is located in the city. Objects in the city may be represented by nodes connected to the city node 301, and objects near or in the school may be represented by nodes connected to the school node 304. When a second user 102 is in the region represented by the school node 304, the AR application may search the portions of the graph "below" the school node 304 to identify content objects near the second user 102 to potentially be displayed. The search may be performed by searching the graph, starting from the school node 304, for content object nodes such as the note content object node 322. For example, the search may involve traversing the graph starting at the school node 304 and checking whether each node represents a content object. The distance between the second user 102 and each content object node may be calculated. If the distance is less than a threshold distance, e.g., 500 centimeters, 1 meter, 2 meters, or other specified distance, then the content object may be displayed to the user (subject to privacy controls and any other applicable restrictions).

In particular embodiments, the AR application may make a threshold determination of whether to display the content of the content object 122 to the first user 101 based on the current distance between the content object 122 and the first user 101. If the current distance is less than a threshold distance, e.g., 2 meters, 4 meters, or other appropriate value, then the AR application on the user's client system may display the content of the content object 122. The current distance between the content object 122 and the first user 101 may be determined based on the locations of the content object 122 and the first user 101. The threshold distance is shown as a perimeter 112. The perimeter 112 is shown for illustrative purposes, and is not ordinarily displayed by the AR application. The content object 122 is not visible to the first user 101 in the example of FIG. 1 because the first user 101 is outside the perimeter 112, which means the current distance between the first user 101 and the content object 122 is greater than the threshold distance. In one example, a portion of the content object 122, e.g., its shape and color, but not its content, may be visible to users who are located outside the perimeter 112.

In particular embodiments, the threshold distance may be used, for example, to reduce the amount of computation performed by the AR application, e.g., by excluding distant content objects, for which content is less likely to be viewed or visible, from further evaluation. The accuracy of positioning systems, such as GPS or WIFI triangulation, may be insufficient to determine a location of the user relative to the content object 122 with sufficient accuracy for the displayed content to appear at the location of the content object 122 on the client system of the second user 102, e.g., on a screen of the client system. For example, locations determined by positioning systems may be accurate to within 2 or 3 meters. To display content associated with objects at locations specified with accuracy greater than 2 or 3 meters, a more accurate algorithm, such as a tracking algorithm based on perception sensor input (e.g., SLAM), may be used. The tracking algorithm may perform extensive computations, and so may be used for objects that have satisfied the threshold distance condition according to a positioning system.

In particular embodiments, the location of the first user 101 may be determined by the AR application using a positioning system. The location of the content object 122 may have been previously determined by the AR application. For example, the content object 122 may have been created in the AR application by the second user 102 for the first user 101 and placed on the real-world object 120 (e.g., the locker), in which case the location of the content object 122 may be based on the location of the real-world object 120. Alternatively or additionally, the location of the content object 122 may be based on the location of the user who placed the content object 122 (e.g., on the locker) at the time the user placed the content object 122.

Since the accuracy of positioning systems such as GPS or WIFI triangulation may be insufficient to determine a location of the content object 122 (e.g., the note) relative to the user with sufficient accuracy for the displayed content to appear at the location of the content object 122 on the client system of the first user 101 on a screen of the client system of the first user 101, a more accurate algorithm, such as an image-based tracking algorithm (e.g., SLAM), may be used to determine the locations of objects that have been determined to be within the threshold distance of the second user 102. The tracking algorithm may determine the coordinates of the content object 122 relative to the first user 101 and the current distance between the content object 122 and the first user 101.

If the first user 101 moves to a location within the threshold distance of the content object 122, e.g., within the perimeter 112, then a more-accurate determination of the location of the first user 101 may be made by a tracking algorithm. The more-accurate location may be used to display the content of the content object 122 on the client system of the first user 101 so that the content appears at or near the location of the content object 122. An example in which the first user 101 is within the threshold distance of the content object 122 is shown in FIG. 2A.

In particular embodiments, content objects may also be associated with or attached to real-world objects that are animate (as opposed to inanimate objects, such as the aforementioned locker). In the example of FIG. 1, a pet ID tag 116 is attached to the dog 104, e.g., by a dog collar. The dog 104 may move within the environment, and the pet ID tag 116 may move with the dog 104.

A first user 101 may leave a message for a second user 102 with their dog 104. When the second user 102 walks into an area near the dog 104, a notification may be presented indicating that the dog has a message. For example, the AR application may determine that the user 102 is in an area near the dog 104 by comparing the GPS coordinates of the client system 103 of the user 102 to the coordinates of the house (or any other geographic region associated with the animate object) where the dog lives. If the second user 102 is within a threshold distance (e.g., 2 meters, 5 meters, 10 meters, or the like) of the house according to the GPS coordinates, then the notification of the message may be presented to the second user 102. The message may appear as a content object on or near the dog 194, e.g., as text above the dog's head. Thus, when the second user 102 is within the threshold distance of the house, the client system 103 may be enabled to identify the real-world object (e.g., an animate object such as a dog or an inanimate object such as a locker) with which to display the AR message. For example, the client system 103 may activate a tracking feature (e.g., using object-recognition algorithms or SLAM) to identify the location at which to display the message. Objects that have few straight edges or corners may be identified using optical object recognition, e.g., video tracking using kernel-based tracking, contour tracking, or another suitable image tracking algorithm. When the notification is presented to the second user 102 indicating that the dog has a message, an image recognizer may begin looking for the dog 104. When the recognizer finds the dog 104, the message may be instantiated in the AR environment above the dog 104. Further, a bounding box may be placed around the recognized image of the dog, so that the message may continue to be displayed over the dog's head as the dog moves to different locations.

As another example, content for a pet ID tag 116 may be displayed on a real-world dog 104 in the AR environment. The content for the tag 116 is an example content object and, similarly to the content object 122, and may contain content such as text, images, video, or the like. The tag 116 and its content may be displayed to users who are located within a threshold distance of the tag 116. The threshold distance is shown as a perimeter 114, which may move with the dog 104. The perimeter 114 is shown for illustrative purposes, and is not ordinarily visible to users in the AR application.

The AR application may make a threshold determination as to whether to display the content of the tag 116 to the second user 102 by determining the current distance between the tag 116 and the second user 102. If the current distance is less than a threshold value, e.g., 2 meters, 4 meters, or other appropriate value, then the AR application may display the content of the tag 116. The current distance may be determined based on the locations of the tag 116 and the second user 102. The current location of the second user 102 may be determined by the AR application using a positioning system, e.g., GPS, WIFI triangulation, or the like. The location of the tag 116 may be based on the location of the dog 104, which may be determined by the AR application using an image-based positioning system (e.g., image recognition technology, such as a convolutional machine-learning model that is trained to identify and segment particular objects of interest in an image or video frame). If the recognized object (e.g., the dog 104) is too small, the system may conclude that the dog is too far away from the second user 102. In this example, the second user 102 is located inside the perimeter 114, which means the distance between the tag 116 and the second user 102 is less than the threshold distance, so the content of the tag 116 may be displayed to the second user 102. For example, the content of the tag 116 may be displayed on a client system of the second user 102 when the second user 102 is looking in the direction of the tag 116. An image-based tracking algorithm, may be used to determine a more-accurate location of the second user 102 or tag 116 for purposes of displaying the content of the tag 116 on the client system of the second user 102.

The more-accurate algorithm may use optical image recognition, for example, to track the location of the tag 116 or the dog 104. The relative position of the tag 116 or dog 104 may be used to determine the more accurate location of the second user 102. The content of the tag 116 may be displayed on the client system of second user 102 at a location on the client system's screen based on the location of the tag determined by the tracking algorithm, so that the content appears at or near the location of the tag 116.

FIG. 2A illustrates an example real-world scene 200. The real-world scene 200 includes real-world objects 120 (such as a locker), a first user 101, a client system 103 used by the first user 101, and a second user 102. A designated location 124 at which a content object 122 may be placed is shown on the real-world object 120. In this example, the content object 122 is a rectangular note. The upper-left corner of the content object 122 may be placed at the designated location 124 so that the content object 122 may appear, when displayed, as shown by the content object outline 121. The content object outline 121 is shown as a dashed line in FIG. 2A to indicate that the content object 122, as a virtual object displayed by the AR application, is not ordinarily visible in the real world. The content object 122 may include text, images, animation, or other content. The content object 122 may be two-dimensional, e.g., a flat rectangular note, or three-dimensional, e.g., a 3D model of a piece of paper or other object onto which content may be written, drawn, copied, or otherwise represented. The AR application may execute on the client system 103. The client system 103 may include a camera 201 and a display screen. The camera 201 may capture an image of the real-world scene 200, and the display screen may display an image that includes or is based on the image of the real-world scene 200.

In an example scenario, a first user 101 may activate an AR mode on the client system 103, e.g., by opening an AR application or a camera application on the client system 103. The first user 101 may create content objects 122 using the AR application, e.g., by composing content, such as the text "Have a nice day!" and selecting a command in the AR application to create a content object based on the text and associate the content object with a real-world object 120. The user may designate a particular location on the real-world object 120 at which the content object 122 is to be displayed in the AR environment. The content object 122 may be stored in a map data structure that represents the AR environment. The map data structure may include representations (e.g., 3D models) of the real-world objects 120 that have been detected by client systems 103 of the first user 101 and other users. The map data structure may also include the locations of the real-world objects 120, and additional information such as types of and users associated with the real-world objects 120. The information stored in the map data structure may be generated by the AR application based on camera and sensor input. The map may be represented as a graph, lookup table, or other suitable data structure.

In particular embodiments, when a content object 122 is created, it may be stored in the map in association with the real-world object 120 and the designated location relative to (e.g., on a surface of) the real-world object 120 at which it is to be displayed. The content object 122 may be displayed to users of the AR application, including the first user 101 and potentially other users who satisfy certain criteria, such as being within a threshold distance of the content object 122, having real-world object 120 or the designated location 124 in their field of view, and having sufficient access permissions. An access-permission check may be performed to determine whether a first user 101 has permission to access (e.g., view an image of) the content object 122. If the first user 101 has permission, then the object may be displayed to the first user 101, e.g., in the AR application on a display of the first user 101's client system 103. If the first user 101 does not have permission, then the object may not be displayed to the first user 101. The determination of whether the first user 101 has permission to access the content object 122 may be made based on information in the social-networking system, such as friend relationships or privacy controls. For example, if the first user 101 is a friend of a second user 102 who created the content object 122, and the second user 102 has indicated that the content object 122 is accessible by friends of the second user 102, then the first user 101 has sufficient permission to access the content object 122. The second user 102 may indicate that the content object 122 is visible to friends by configuring a privacy control option in the social-networking system that applies to content created by the second user 102 and indicates that the content is visible to friends of the second user 102. As another example, privacy controls may be configured by the second user 102 to indicate that content created by the second user 102 (or the particular content object 122) is accessible by other users of the social-networking system who are not friends of the second user 102 but satisfy another condition, e.g., that the other users live in the same city as the second user 102 or attend the same school as the second user 102.

To display content objects 122, the AR application may determine the client system's location, and search the map data structure for content objects 122 near the client system's location. Content objects 122 that have previously been placed at locations near the client system 103 (e.g., within visible range or within a threshold distance, such as 1 meter, 2 meters, or the like) may be identified by the AR application and displayed at their designated locations if they are visible to the first user 101 according to the user's line of sight, distance from the content objects, and permissions associated with the content objects. The identification of the client system's location may be referred to herein as localization, or re-localization if the client system has previously performed localization at or near the location and constructed a map, which may be used in the re-localization. The content objects are ordinarily associated with real-world objects, which are in turn associated with locations in the AR environment. The AR application may identify nearby content objects by searching the map for content objects associated with the real-world objects near the client system (e.g., within visible range or within a threshold distance of the client system). Alternatively or additionally, the AR application may identify nearby content objects by searching the map for content objects having locations near the client system, regardless of the real-world objects with which the content objects are associated.

In particular embodiments, the content object 122 may be displayed as an AR effect by the AR application. For example, an image of the real-world object 120 captured by the camera 201 is shown on the display screen of the client system 103. The displayed image may include AR effects such as an image of the content object 122, which may be superimposed on the image of the real-world scene displayed on the client system 103. An example displayed image is shown in FIG. 2B.

The AR application may display the content object 122 and its content to a first user 101 when the first user 101 is within a perimeter 112 and the content object 122 is in the user 101's field of view. The content object 122 may be invisible to users who are not within the perimeter 112. The perimeter 112 may correspond to a threshold distance from a location 124 of the content object 122. Alternatively or additionally, the perimeter 112 may correspond to a threshold distance from a surface of the real-world object 120 associated with the content object 122. The threshold distance may be associated with, e.g., an attribute of, the content object 122. When the first user 101 has walked or otherwise moved the client system 103 to a location within the perimeter 112, the content object 122 and its content may be displayed to the first user 101, e.g., by the AR application on the client system 103. In the example of FIG. 2A, since the first user 101 is within the perimeter 112, the content object 122 and its content are displayed on the client system 103 of the first user 101 at the location shown by the content object outline 121. Further, the content object 122 and its content are not displayed to the second user 102, e.g., not displayed by the AR application on a client system of the second user 102, because the second user 102 is not within the perimeter 112. Alternatively, the content object 122 may be displayed without content to users who are outside the perimeter 112, such as the second user 102, e.g., as an object in the shape of a note. The AR application may determine whether the second user 102 is located within the perimeter 112 using a positioning system such as GPS or the like.

In particular embodiments, when the content object 122 is displayed, its location may be set such that a designated point on the content object 122, e.g., the upper-left corner of the content object 122, is at the designated location 124 on the locker. The designated location 124 may be specified by a user such as one of the users 101, 102 when the content object is associated with the real-world object 120. For example, the user 101 may specify the designated location 124 by pointing the camera 201 at or touching the real-world object 120 through a user interface of the client system 103 at the designated location 124 or otherwise indicating the designated location 124 in the AR application. In particular embodiments, the first user 101 may specify the designated location 124 by selecting a representation of the real-world object 120, such as a name of the real-world object 120 displayed in a list or on a graph node, on an AR map displayed in a user interface on the client system 103. The user interface may display a representation of the real-world object 120, e.g., a model, and the first user 101 may indicate the designated location 124 on the representation. Alternatively, the designated location 124 may be automatically selected as a point on a surface of the real-world object 120, as described below. In this way the first user 101 may specify a designated location 124 on a real-world object 120 via a user interface without being physically located at or near the real-world object 120.

Alternatively or additionally, the designated location 124 may be determined automatically, e.g., without user input. In one example, the first user 101 may indicate that the content object 122 is to be associated with the real-world object 120, e.g., by pointing the camera 201 at or otherwise selecting the real-world object 120 in the AR application, and the designated location 124 on the real-world object 120 may be selected automatically, e.g., as a point on the surface of the real-world object 120 visible to the user. As an example, the designated location 124 may be automatically determined to be the center of a surface facing the second user 102 when the second user 102 associates the content object 122 with the real-world object 120. Although the content object 122 is shown (by its outline 121) as being located on a surface of the real-world object in FIG. 2A, the content object 122 may alternatively be displayed at a distance from the real-world object, e.g., above or to one side of the real-world object 120. In another example, the content object 122 may be displayed at a location specified relative to the viewing first user 101, e.g., a designated distance from the first user 101 in the first user 101's line of sight.

FIG. 2B illustrates an example real-world scene captured within an image 204 or video frame with a superimposed content object 122. The scene in the image 204 may be a depiction of an AR environment generated by an AR application. The image 204 may be a still image or video frame captured by a camera 201. The image 204 may be displayed on the client system 103 of the first user 101, for example. The scene may include images of real-world objects 120 (such as a locker), and AR effects, such as a content object 122. The content object 122 is an example of a content object 122. The content object 122 may be displayed at the designated location 124 on the real-world object 120, e.g., superimposed on the image of the real-world object 120 at the designated location 124, as shown in FIG. 2B. The content object 122 may have associated content, which is text ("Have a nice day!") in this example, though the content object 122 may have other types of content, e.g., images, video, or other types of media. The content of the content object 122 may be displayed on the content object 122 itself, as shown in FIG. 2B, or at other locations, e.g., near the content object 122.

The content object 122 may be rendered on the client system 103's screen based on the determined location of the real-world object 120, and further based on the designated location 124 of the content object 122 on or in relation to the real-world object 120. The tracking algorithm may be an image-based tracking algorithm such as a SLAM algorithm. The tracking algorithm may determine the location and orientation of the client system 103 and location of at least one real-world object 120 by identifying a set of "real-time" (e.g., recently received from the camera 201) feature points 130 on the real-world object 120 in the image 204, and searching the map for a "stored" (e.g., previously identified) set of points 230, as shown in FIG. 2C, that match the real-time feature points 130. If a set of such matching feature points is found in the map, then the real-world object 120 has previously been identified (whether by the user viewing the scene, the user who created (e.g., posted) the content or any other user), and its feature points have been stored in the map in association with attributes of the real-world object 120, which may be retrieved from the map. The attributes available in the map include a location of the real-world object 120 in the AR environment, a name or other identifier of the real-world object 120, semantic information such as a type of the object (e.g., building, locker, table, and so on), content objects 122 associated with the real-world object 120, if any, and designated locations 124 of the content objects 122. Example real-time feature points 130 of the real-world object 120 include corner feature points 130a, 130b, 130c, 130d of the front surface, which are endpoints of edges 140a, 140b, 140c, 140d of the front surface, and corner feature points 130e, 130f of the left surface, which are endpoints of edges 142a, 142b, 142c of the left surface.

The SLAM algorithm may use multiple views of the real-world objects taken by the camera 201 from different viewpoints to identify distances from the camera 201 to the real-world objects and refine the calculated locations of the real-world objects. The multiple views may be generated when user the moves the client system, e.g., by pointing the camera 201 of the client system 103 in different directions or walking while the client system's camera 201 is capturing images of the real world.

FIG. 2C illustrates example visual representations of a model 220 of a real-world object 120. The visual representation of the 3D model 220 may be associated with the real-world scene 200 shown in FIG. 2A. The model 220 may correspond to a real-world object 120. The model 220 may be a 3D model and may include stored feature points 230 corresponding to previously-identified real-time feature points 130 of the corresponding real-world object 120. The model 220 may be stored in a map of the AR environment in association with a location, which may be the location of the real-world object 120 to which the stored feature points 230 correspond. When stored in the AR map, the 3D model 220 may be referred to herein as a stored model 220, and the stored feature points 230 may be referred to herein as stored feature points 230. Example stored feature points 230 of the stored model 220 include corner stored feature points 230a, 230b, 230c, 230d of the front surface, which are endpoints of edges 240a, 240b, 240c, 240d of the front surface, and stored corner feature points 230e, 230f of the left surface, which are corners of edges 242a, 242b, 242c of the left surface. FIG. 2C also illustrates a visual representation of a stored content object model 222, which may be a 3D model of a content object 122 (a note), and may be stored in the AR map. The stored content object model 222 may be a model of a flat object, such as the note shown in FIG. 2C, or of a 3D object, and may include content to be rendered as part of the model. The stored content object model 222 may be stored in the AR map when the user creates a content object 122, for example. The stored feature points 230 of the stored model 220 correspond to the feature points 130 of the real-world object 120 because the location of each feature point 130 (e.g., 130a) in 3D space corresponds to a location of a corresponding feature point 230 (e.g., 230a) of the model 220, e.g., the 3D offset vector between each pair of feature points 130, 230 is the same or substantially, the same, e.g., the same magnitude and direction within a tolerance of plus or minus 1%, 3%, 5%, 10%, or other suitable tolerance. As an example, the feature points 130 correspond to the feature points 230 because both sets 130 and 230 correspond to the same shape, which is the shape of the locker in this example, but may be any 3D shape of a real-world object.

In particular embodiments, as discussed above, to generate the image 204 showing the real-world scene with the superimposed content object 122, the AR application may identify the location of the client system 103 using location sensors such as GPS or WIFI and the locations of real-world objects 120 detected by the camera 201 of the client system 103. For example, GPS-based localization may be performed, and the AR map may be searched for content objects that are located at or near the identified location. The AR application may then attempt to match the real-world object 120 (e.g., as identified using SLAM and/or image-recognition technology) to a stored object associated with the identified location. When the client system 103 captures an image using the camera 201, the AR application may search the AR map for stored models that match real-world objects in the captured image. If a matching stored model is found, then the attributes of the stored model may be used to identify and display content objects associated with nearby real-world objects. The matching may involve use of a SLAM algorithm, though the stored models may reduce the amount of computation and time used by the SLAM algorithm in this case. If a matching stored model is not found, then a SLAM algorithm may be used to identify the location of the client system 103 and identify real-time feature points 130 of real-world objects 120 in the AR environment near the location. The AR application may then store the identified real-time feature points as a stored model 220 in the AR map in association with the location of the client system 103. The AR application may also determine other attributes of the stored model 220, including semantic information such as the type of the real-world object, and store the attributes in the AR map in association with the stored model 220.

The content object 122 may be superimposed on the real-world object, such as the locker, at a particular location on the real-world object. The particular location is on the front surface of the locker in the example of FIG. 2B. The particular location may be specified when the content object 122 is associated with the real-world object, e.g., by a user who attaches the content object 122 to the locker by placing the content object 122 at the particular location on the locker. The particular location on the real-world may be represented as a three-dimensional offset from a designated point on the real-world object, e.g., as a x, y, and z distances from the lower-left corner of the surface on which the content object 122 is attached. The position of the content object 122 on the locker may be determined by adding the offset to the location of the designated point on the real-world object and using the resulting location as the location of a designated point on the content object 122, e.g., as the location of the upper-left corner of the content object 122. The location of the content object 122 relative to the real-world object may thus be determined using an offset between designated points on the real-world object and the content object 122. Multiple offsets from multiple corresponding points may be used to specify the location of the content object 122 relative to the real-world object. The offset(s) may be determined when the content object 122 is placed on the real-world object. The designated points and offset(s) may be determined using a positioning algorithm that identifies positions of points on surfaces relative to the edges of the surface, for example. The points on the surface of the real-world object may be identified based on the location on the real-world object specified by first user 101 (or other user) when the user placed the content object 122. The determined location of the content object 122 in the AR environment may be mapped to a location on the display screen of the client system 103.

FIG. 2D illustrates a designated location 124 of a content object 122 on a real-world object 120 in relation to feature points 130. The designated location 124 may be received by the AR application, e.g., from a first user 101, or may be determined automatically, e.g., as described above. The designated location 124 may be represented using one or more offset vectors 150 from one or more feature points 130. The offset vectors 150 are shown as dashed lines, and include a first offset vector 150a between the designated location 124 and the feature point 130a, and a second offset vector 150b between the designated location 124 and the feature point 130b. Although the designated location 124 is on a front surface of the real-world object 120 in this example, the designated location 124 may be at any suitable position relative to one or more of the feature points 130.

In particular embodiments, the offsets vectors 150 may be represented as x, y, and z components. Each offset vector 150 may be associated with a feature point 130, so that adding the offset vector to its associated feature point may produce a location (e.g., coordinates) of the designated location 124 relative to the real-world object 120. The offset vectors 150 may be determined when the designated location 124 is received or otherwise determined, when the stored model 220 of the real-world object 120 is added to the AR map, or at other suitable time. The (x, y, z) components of each offset vector 150 may be determined by, for example, subtracting the (x, y, z) coordinates of the designated location 124 from the (x, y, z) coordinates of the corresponding feature point 130. The (x, y, z) representation of the offset vector 130 may then be stored in the AR map in association with the stored model 220 and the corresponding feature point 130. Subsequently, the offset vector 130 may be retrieved from the AR map to determine the location of the designated location 124 on the stored model 220.

In particular embodiments, when displaying a content object 122 such as the content object 122 over an image 204 of a real-world object 120, such as the locker, the location in the AR environment at which to display the content object 122 may be determined by identifying the location of the real-world object 120 in the AR environment and retrieving, from the AR map, the content object 122 and an offset vector 150 of the designated location 124 at which the content object is to be displayed. The retrieved offset vectors 150 may be added to a corresponding set of feature points 130 of the real-world object 120 (with appropriate transformations of the offset vectors 150 based on the orientation of the real-world object 120) to determine the location of the content object. The content object 122 may then be displayed at its determined location.

To determine the location at which to display a content object 122 on (or near) a real-world object 120, the AR application may search the AR map for a stored model 220 having stored feature points 230 that match the real-time feature points 130 of the real-world object 120. To do so, the AR application may retrieve the "absolute" location of a candidate object from the AR map that may correspond to the real-world object 120. (The "absolute" location of the real-world object 120 may have been determined based on real-time feature points detected by a camera 201, which are relative to the known GPS location of the camera, and stored in the AR map when the real-world object 120 was initially identified, e.g., by a SLAM algorithm, as described above.) The "absolute" location may be, e.g., coordinates in the AR environment at which the real-world object is located. Note that the term "absolute" location is used for explanatory purposes, and may refer to a location that is actually relative to another location, e.g., relative to a point outside the AR environment, such as the latitude, longitude, and altitude of a geographic area in which the AR environment is located.

In particular embodiments, the locations in the AR environment of real-time feature points 130 that correspond to the stored feature points 230 may have been identified, e.g., by the SLAM algorithm. As described above, after matching the real-world feature points 130 with the stored feature points 230, the AR system may determine the designated location 124 by adding the offset vectors 150 to the corresponding feature points 130 (with appropriate transformations of the offset vectors 150 based on the orientation of the real-world object 120).

FIG. 2E illustrates an example of a visual representation of stored offset vectors 250 associated with a 3D object model that specify a designated location 124 of a content object 122 in relation to stored feature points 230 of the model. The stored offset vectors 250 nay be stored in and retrievable from an AR map, and correspond to the offset vectors 150 shown in FIG. 2D. If the stored model 220 is associated with a stored content object model 222, then one or more stored 3D offset vectors 250 for the stored content object may be retrieved from the AR map. Each stored offset vector 250 may be associated with a stored feature point 230 and may specify the designated location 124 of the content object 122 relative to the stored feature point 230. Multiple stored offset vectors 250 may be present, e.g., to improve accuracy or to provide alternatives to stored feature points for which corresponding real-time feature points cannot be identified in the real-world scene or are otherwise unknown or inaccurate. Multiple stored offset vectors 250 are shown as dashed lines in FIG. 2E, including a first stored offset vector 250a that specifies the designated location 124 relative to the stored feature point 230a, and a second stored offset vector 250b that specifies the designated location 124 relative to the stored feature point 230b. Additional stored offset vectors 250 are shown as dashed lines between the designated location 124 and corresponding feature points 230.

Figure 3B:
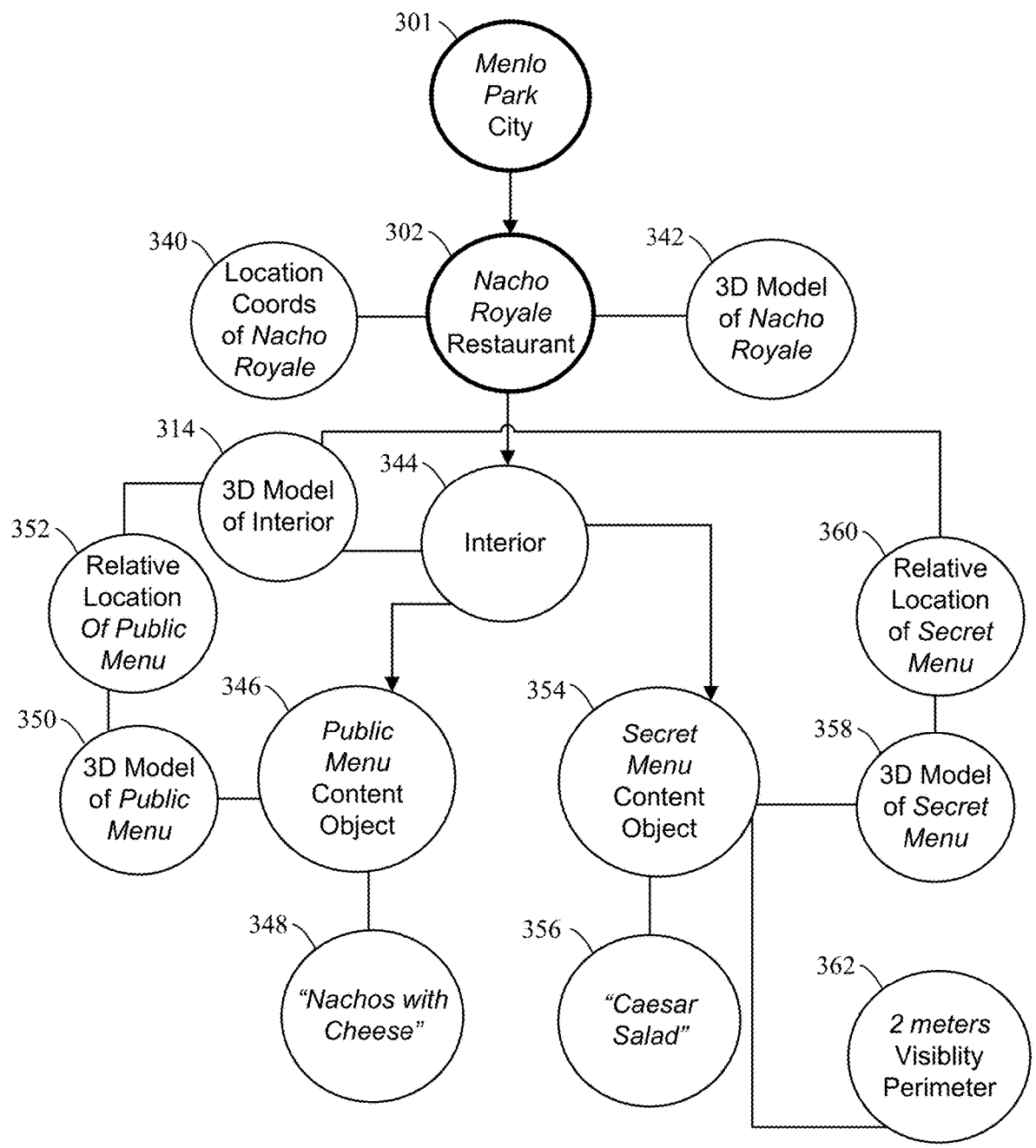
Figure 3C:
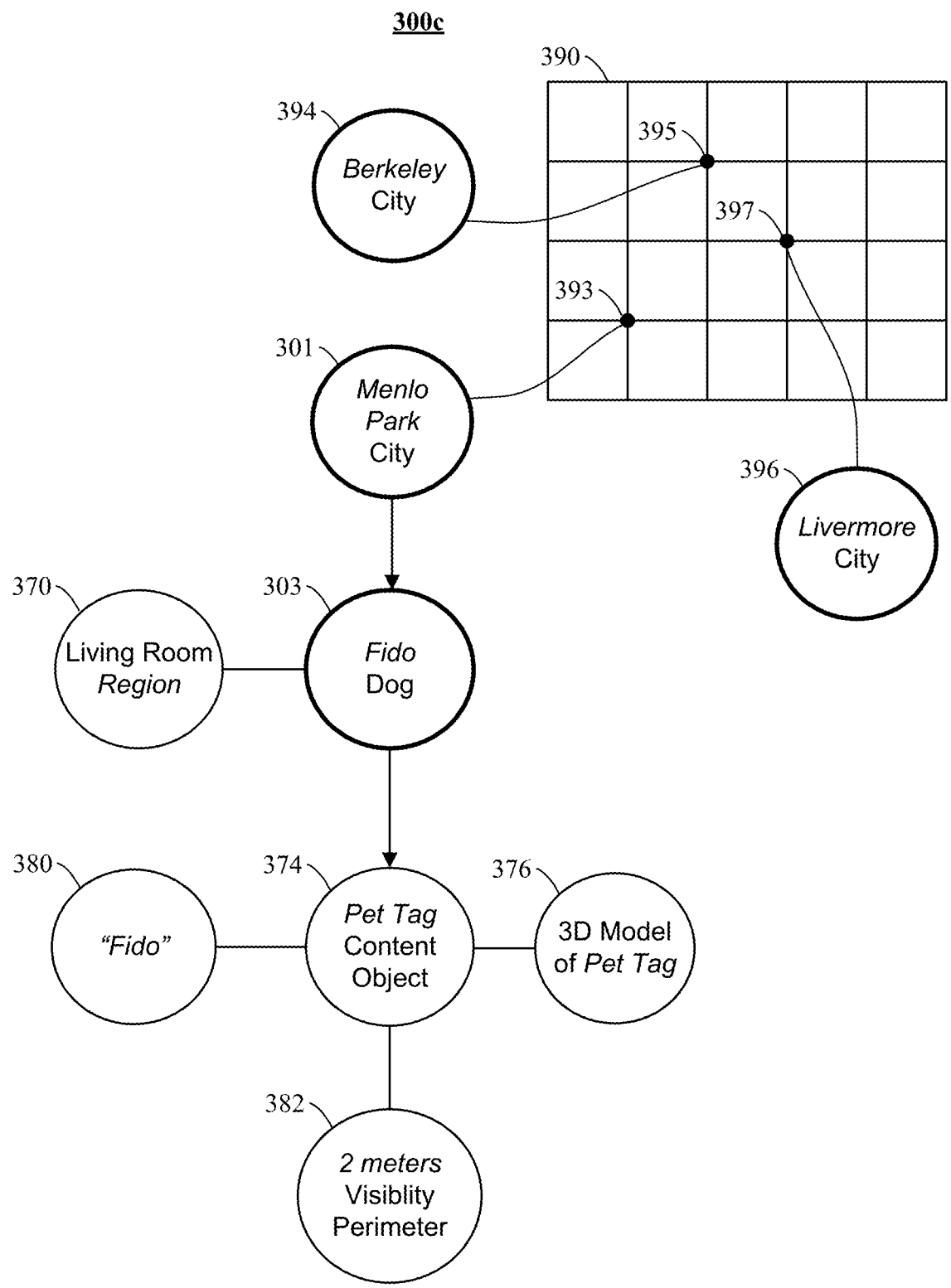

FIGS. 3A-3C illustrate example augmented-reality (AR) maps 300. AR map portions 300a,b,c may store information that represents objects in an AR environment, such as models of real-world objects and the locations of the real-world objects, and models of virtual objects, such as content objects, and their associated locations. The AR map portions 300a,b,c may be portions of a single AR map 300, which may correspond to a single graph of connected nodes. Nodes that represent real-world objects, e.g., the city node 301, are illustrated as thicker circles than nodes representing virtual objects such as content objects or information, e.g., a 3D model node 308. The node 301 may be a geographical root node, which may be associated with a geographic region, e.g., the city of Menlo Park. Although the region is a city in this example, regions of other sizes are possible, e.g., a city block, a neighborhood, a region of several cities, and so on. Nodes in the map 300, such as a school node 304, may be in the region specified by the root node of the map 300. Nodes in the map 300 may have associated location coordinates, which may be specified in connected nodes. For example, a location node 306 is connected to the school node 304 and specifies location coordinates, e.g., latitude, longitude, and altitude, for the school. The city node 301 has a directed edge to the school node 304 to indicate that the school 304 is in the city 301. Other nodes that represent objects similarly have directed edges to contained objects (which may be smaller objects) and directed edges from container objects (which may be larger objects). In this example, the school 304 has a directed edge to an interior node 310 that represents the interior of the school. The interior node 310 has a directed edge to a locker node 316 that represents a locker in the interior of the school. Each of the AR map portions 300a,b,c may thus be understood as representing a map of a portion of an AR environment in which objects from each of the AR maps may be displayed. The AR maps may also include stored virtual objects that may be superimposed on a view of the real world displayed in an AR application. Although the AR maps 300 shown in FIGS. 3A-3C are illustrated as graph data structures, other representations are possible. For example, an AR map 300 may alternatively be represented as a table of rows and columns.

In particular embodiments, the AR map 300 may include one or more stored models 220 of real-world objects. Each stored model 220 may be represented in the AR map 300 as a set of attributes, such as a name and location of the object represented by the model, and a set of coordinates of stored feature points 230 that can be used to generate and recognize visual representations of the stored model 220. The AR map 300 may be accessed by client systems 103 via one or more server computer systems, which may be part of a social-networking system 560 and may communicate via a network 510. The AR map 300 may be stored in a database on storage media such as a magnetic disks or flash-memory-based storage devices, for example. Different portions of the AR map 300 may be received from different client systems 103. The portions of the AR map that include stored 3D models received from the user's client system 103 may be stored in a memory of the user's client system 103 and sent to the social-networking system 560 via the network 510. The user's client system 103 may also receive portions of the AR map created by other client systems of other users and store the received portions in the memory of the user's client system 103.

The city node 301 has edges connected to nodes that represent three real-world objects: a restaurant node 302 named "Nacho Royale," a dog node 303 named "Fido," and the school node 304 named "Monta Vista." The AR map portion 300a that corresponds to and includes nodes for the school 304 is shown in FIG. 3A. Further, the AR map portion 300a shown in FIG. 3A may have been received from a particular user's client system, but may be accessible to other users, who may be using other client systems, subject to privacy controls and other access controls that may allow only certain users to access certain portions of the AR map 300. The AR map portions 300b,c may similarly be accessible to different users and client systems from which the map portions 300b,c are received.

In the AR map portion 300a shown in FIG. 3A, the school node 304 is connected to a location node 306 that specifies the location of the school, e.g., as x, y, z coordinates or latitude, longitude, and altitude. The x, y, z coordinates may be relative to a location associated with the city node 301 (e.g., a point in the city Menlo Park). Latitude, longitude, and altitude may be used so that they may be directly matched with a user's GPS location. The school node 304 is also connected to a 3D school model node 308 that specifies a 3D model of the school building 110 as a set of feature points.

The school node 304 is also connected to an interior node 310 that represents an interior space of the school. The interior node 310 is connected to a 3D interior model node 314 that may specify a 3D model of at least a portion of the interior of the school building as a set of feature points. The interior may also include models of other objects. For example, a locker node 316, which represents a real-world locker named "Locker 7120," is connected to the interior node.

The locker node 316 is connected to a 3D locker model node 320 that may include a set of stored feature points 230 specifying a 3D model of the locker, such as the stored model 220 shown visually in FIG. 2C. The locker model node 320 is connected to a locker location node 326 that is in turn connected to the interior model node 314 and thus specifies a location of the locker relative to the interior, e.g., as a 3D offset vector relative to one or more points (such as feature points) on the 3D model of the interior.

The locker node 316 is also connected to a note content object node 322 that represents a note content object. The note content object node 322 is connected to a content node 324 ("Have a Nice Day!") and to a visibility perimeter node 328, which indicates that content of the note content object is visible from locations within a perimeter of 1 meter (subject to privacy and other access control restrictions).

The note content object node 322 is also connected to a 3D note model node 330 that may specify a 3D model of a note, such as the stored content object model 222 shown visually in FIG. 2C. The stored content object model 222 may be represented as a set of feature points. The note model node 330 is connected to a note location node 332 that is in turn connected to the locker model node 320 and thus specifies a location of the note relative to the locker, e.g., as one or more 3D offset vectors between corresponding feature points of the locker model and a designated location 124 at which the note is to be located.

An AR map portion 300b that corresponds to and includes nodes for the restaurant node 302 is shown in FIG. 3B. The AR map portion 300b may be a portion of the AR map 300 that also includes the nodes shown in FIGS. 3A and 3C. In the AR map portion 300b shown, the restaurant node 302 is connected to a location node 340 that specifies the location of the restaurant, e.g., as latitude, longitude, and altitude. The restaurant node 302 is also connected to a 3D restaurant model node 342 that specifies a 3D model of the restaurant building as a set of feature points.

The restaurant node 302 is also connected to an interior node 344 that represents an interior space of the school. The interior node 344 is connected to a public menu content object node 346 that represents a publicly-visible menu of food items in the restaurant. The public menu content object node 346 is connected to a 3D public menu model node 350, which may include a set of stored feature points specifying a 3D model of the public menu. The public menu content object node 346 is also connected to a content node 348 ("Nachos with Cheese"). The public menu model node 350 is connected to a public menu location node 352 that is in turn connected to the 3D model of the interior 314 and thus specifies a location of the public menu relative to the interior, e.g., as a 3D offset vector relative to one or more points (such as feature points) on a 3D model of the interior.

The interior node 344 is also connected to a secret menu content object node 354 that represents a secret menu of food items in the restaurant. The secret menu content object node 354 is connected to a 3D secret menu model node 358, which may include a set of stored feature points specifying a 3D model of the private menu. The secret menu content object node 354 is also connected to a content node 356 ("Caesar Salad"). The secret menu model node 358 is connected to a secret menu location node 360 that is in turn connected to the 3D model of the interior 314 and thus specifies a location of the secret menu relative to the interior, e.g., as a 3D offset vector relative to one or more points (such as feature points) on a 3D model of the interior. The secret menu and its content are only visible to users who are located within a visibility perimeter (subject to privacy and other access control restrictions). The secret menu content object node 354 is connected to a visibility perimeter node 362, which indicates that the secret menu content object's visibility perimeter is 2 meters from the secret menu content object.

In particular embodiments, content objects may be associated with movable or animate objects. The movable objects may be located in particular regions, such as rooms in houses or buildings, yards, or parks. The movable objects may include, e.g., a dog. When the user is in the same region as the dog, e.g., a living room in a house, the user may use the client system 130 to identify the dog. If the dog is identified (e.g., detected by image recognition in an image captured by the client system 103's camera 201), then a content object 374 may be displayed on the client system 103. An AR map portion 300c that corresponds to and includes nodes for a dog node 303 ("Fido") is shown in FIG. 3C. The dog node 303 is connected to a region node 370 ("Living Room") that specifies the location of the dog, e.g., as being in a region such as a room in a house altitude. FIG. 3C also shows an example geographic map 390, which includes the cities Menlo Park 393, Berkeley 395, and Livermore 397. The association between the Menlo Park node 301 and the geographic area of the city of Menlo Park 393 as shown by a line from the node 301 to the area within the city of Menlo Park 393 on the map. The Menlo Park node 301 may correspond to the area of the city Menlo Park 393, so that nodes connected to the Menlo Park node 301 may represent locations within the city Menlo Park 393. Similarly, the association between the Berkeley node 394 and the geographic area of the city of Berkeley 395 is shown by a line from the Berkeley node 394 to the area within the city of Berkeley 395. The association between the Livermore node 396 and the geographic area of the city of Livermore 397 is similarly shown by a line from the Livermore node 396 to the area within the city of Livermore 397. Nodes representing physical and virtual objects within the cities of Berkeley and Livermore may be connected to the Berkeley node 394 and the Livermore node 396, respectively.

The dog node 303 is also connected to a pet tag content object node 374 that represents a pet ID tag 116 on which the dog's name may be inscribed. The pet tag content object node 374 is connected to a content node 380 ("Fido") and to a visibility perimeter node 382, which indicates that the content of the pet tag content object is visible from locations within a perimeter of 2 meters (subject to privacy and other access control restrictions).

The pet tag content object node 374 is also connected to a 3D pet tag model node 376 that may specify a 3D model of the pet tag. The pet tag model may be represented as a set of feature points or other type of 3D model, e.g., a polygon mesh. The location of the pet tag may be specified as a named location or body part of the dog, e.g., e.g., above, next to, below, head, tail, etc., which image recognition may identify.

In particular embodiments, the augmented-reality map 300 may identify which users have access to which pieces of content. If a user creates a content object and indicates that the content object is to be accessible by the friend but no other users, then the message content exists on the map, but only the user and the friend may access the message. A sender may physically walk to a locker and place the message there. A message sender need not be physically present at the location to be associated with the message. For example, a user sending a message may designate a real-world object on which the message is to be placed without being at the location of the real-world object. For example, the sender may create the message and send the message to a locker in one building when the sender is located in a different building. The AR system may determine the locker's location and deliver the message to recipients who walk up to the locker.

In particular embodiments, placing AR content objects at designated locations in the AR environment and identifying content objects to be displayed may involve calculating the location and motion of the client system. The calculations may be performed by a tracking algorithm, e.g., SLAM or the like. The tracking algorithm may detect sets of 3D points in images of the real-world environment, which are referred to as feature points, and identify correlations between the real-world feature points and previously-seen feature points. A user's client system 103 may use a tracking algorithm to scan an image of the user's real-world surroundings for AR content objects. A SLAM tracking algorithm may use the techniques of (1) mapping and (2) localization/re-localization. Mapping may include collecting a variety of signals, including visual, IMU (Inertial Measurement Unit), sensors (gyro, accelerometer, magnetometer), GPS, WIFI strength, BLUETOOTH strength, and so on. An approximation of the client system 103's current location may be determined based on those signals. Localization may include determining the client system 103's location more accurately based on images received from a camera feed in addition to the sensor data (such as inertial data received from an IMU feed). The client system 103's location may be extrapolated from the camera feed and IMU feed. Repeated applications of the localization technique at or near locations where localization was previously performed may be referred to as "re-localization." A map of the AR environment may thus be generated. The results of localization and re-localization may include a set of points in 3D space that form a map of a portion of the AR environment seen by the client system 103's camera 201 at locations visited by the client system 103.

In particular embodiments, to place an AR content object on a real-world table in a room, for example, the AR application may calculate the distances between real-world objects in the AR environment, such as distances between the table and a wall, light switch, door knob, trash can, and so on. The AR application may generate a 3D model of the AR environment based on the feature points on these real-world objects. When the client system 103 is moved, e.g., by a distance of 2 inches, the client system 103's location may be updated by finding the same feature points just seen, and adjusting the location coordinates of the AR content with respect to the client system 103, so that the AR content appears, on the client system 103's display, to stay in the same place in the AR environment.

In particular embodiments, at the end of an AR session, e.g., when the user turns off the client system 103 or moves to a different location, the 3D model that corresponds to the feature points may be stored with the associated WIFI, BLUETOOTH, and GPS metadata. Thus, if the user leaves and subsequently returns to the room, the AR system may determine, based on GPS/WIFI/BLUETOOTH, that the user's client system 103 is in or near the room. Further, when the camera 201 is opened, re-localization may be performed to identify the client system 103's location. During re-localization, the door knob, trashcan, and other points previously detected and stored in map may be recognized. The AR content, e.g., a note, may then be displayed at the corresponding locations in the AR environment. Higher-quality sensor data may increase the likelihood of successfully re-localizing.

In particular embodiments, models stored in the AR map 300 may be associated with a time or range of times in addition to a location in the map. Given appropriate privacy controls, when a first user 101 has a locker, and a second user 102 has a locker next to the first user's locker at a different time, e.g., at night, the second user 102 may open their camera 201 and leave a message on their own locker. Data associated with the second user 102, such as data gathered by the second user's camera, may be used for the first user's locker as well as for the second user's locker. Thus, rather than having distinct views of the locker for their associated users, the views may be combined so that the data updates the AR map 300. Images and other data from multiple viewpoints from different users 101, 102 may be combined into a single AR map 300, even if the different users access the viewpoints separately.

For example, if several people look at a real-world fountain, then there are several different perspectives, and several views that can be used to update the model of the fountain in the augmented-reality map with sets of feature points gathered from the different perspectives. The several people are running SLAM and looking at the fountain from different angles. Subsequently a user whose client system 103 recognizes any of the feature point sets is likely looking at the fountain. The data may thus be crowdsourced from multiple people located near the fountain at different times of day. The time of day may be associated with each set of sensory data. At each location, there may be different sets of sensory data gathered by different people. If the retrieving user's sensory data matches any of the representative data captured by another user at a location, and a content object is associated with a fountain at the location, then the retrieving user is at the location, and the appropriate content may be displayed.

SLAM ordinarily has a startup phase, which may occur during, e.g., the first 5 seconds of using SLAM, in which a camera wiggle is ordinarily needed to identify or generate 3D feature points. For example, the user may be asked to move or wiggle the client device. However, in particular embodiments, the need to wiggle the camera may be eliminated. Since location sensors (e.g., GPS/WIFI/BLUETOOTH) are being used, a 3D map is sent to the client system 103 based on the location identified by the location sensors. The client system 103 receives the 3D map that it is looking for, and can pre-initialize to the 3D map. When the client system 103's camera is opened, matching may immediately begin using the received map without any local map-building. The SLAM wiggle may involve moving the phone while SLAM is initializing to get multiple viewpoints of the same room. These images may be used to compute stereo depth to re-localize to the environment. In the disclosed AR system, a "bubble" in which the client system 103 is located may be identified using location sensors, and a set of 3D maps for that bubble may be sent to the client system 103. The client system 103 may match one or more of the received 3D maps to the image received from the camera to identify the 3D map that corresponds to the client system 103's location. The SLAM initialization may be replaced with this matching, which is much quicker than the SLAM wiggle.

In particular embodiments, semantic information may be used to recognize a type of environment or location based on camera images. For example, an area in the AR environment may be recognized as a room that is a kitchen, a living room, a bedroom, or the like. A sending user may request that a 3D AR message be left for a user in his living room. When the user walks into his living room, the message may appear. The sender can thus target the message more precisely using this semantic information. For example, a sender may create a message and associate the message with the recipient user's living room. When a user selects a command to post a message, a list of locations at which content can be posted may be presented to the user. If a user has ownership over an environment, e.g., the user's house, then the user may indicate where other users may place objects, e.g., in the living room or kitchen, but not in the bedroom. Alternatively, 3D models of the environment may be shared between users. Users may build 3D models of places that interest them. For example, a user may build a 3D model of their front lawn by capturing it in 3D with their camera. When a friend wants to place a content object at the user's house, the user's friend sees a 3D model of the front lawn, and can place the content object on that model in the user interface. When the user goes to their lawn in real time, the content object may be presented on the user's client system.

Figure 4:
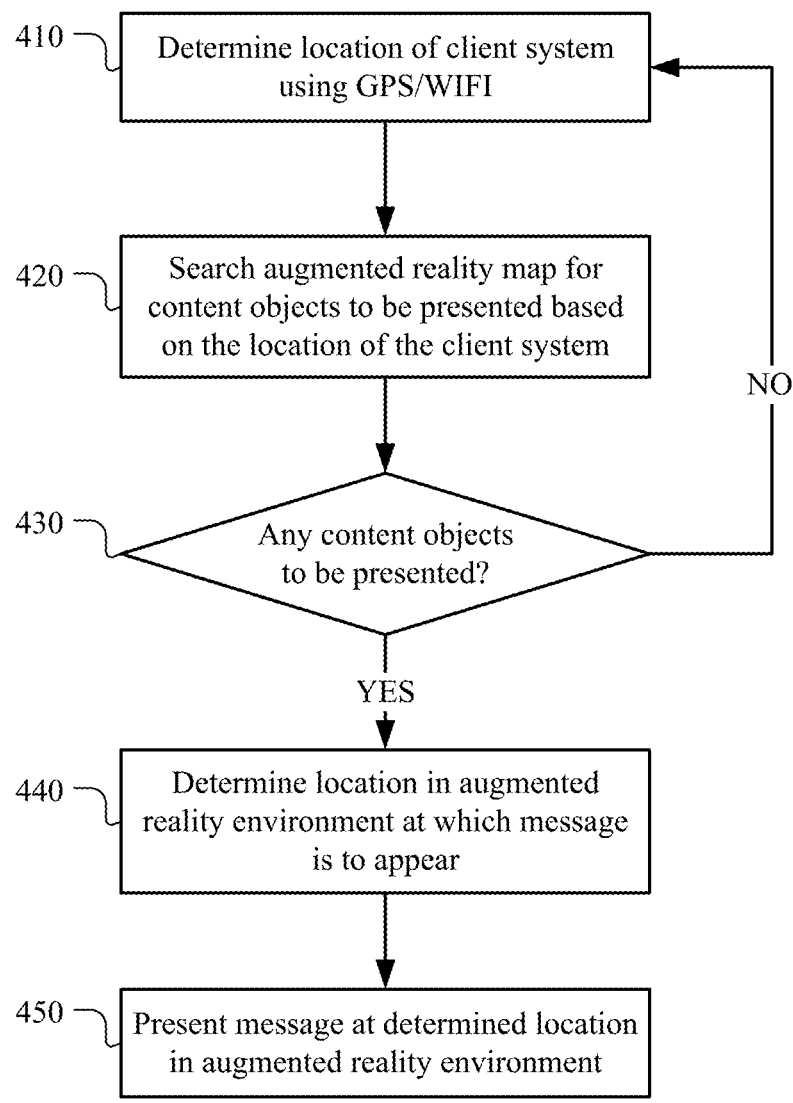
FIGS. 4 and 5 illustrate example methods for displaying content in association with real-world objects.

FIG. 4 illustrates an example method 400 for displaying content in association with real-world objects. The method may begin at step 410, where the method may determine a location of a client system using location sensors such as GPS/WIFI/BLUETOOTH. The location may be an approximate location with accuracy limited by the particular sensors used to identify the location. At step 420, the method may search an augmented-reality map for content objects to be presented based on the location of the client system determined at step 410. At step 430, the method may determine whether there are any content objects within a threshold distance of the user's location to be presented. If not, the method repeats from step 410. If so, then at step 440, the method may determine a location in the augmented reality environment at which the message is to appear. At step 450, the method may present the message at the determined location in augmented reality environment. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for displaying content in association with real-world objects including the particular steps of the method of FIG. 4, this disclosure contemplates any suitable method for displaying content in association with real-world objects including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
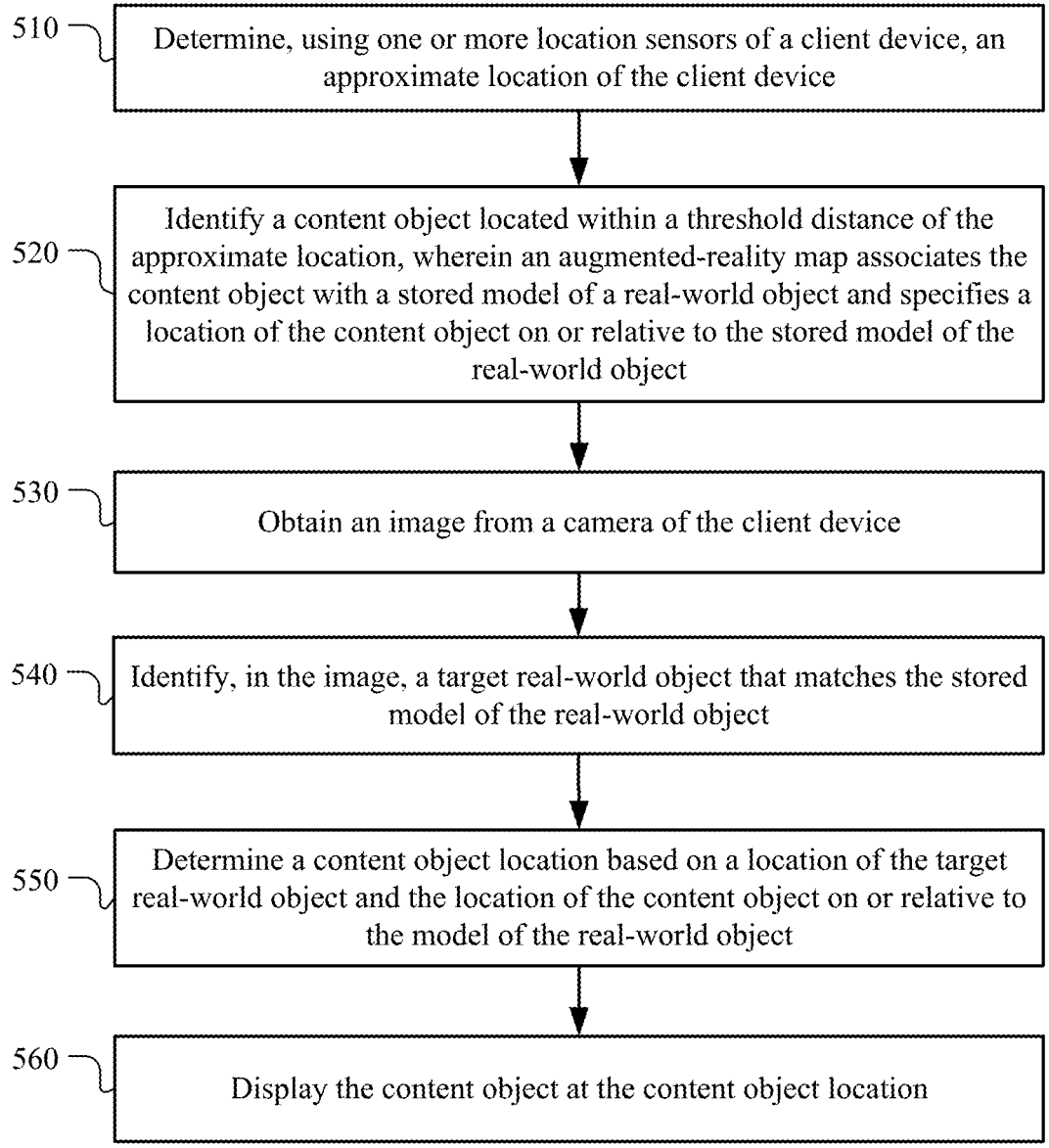

FIG. 5 illustrates an example method 500 for displaying content in association with real-world objects. The method may begin at step 510, where the method may determine, using one or more location sensors of a client system 103, an approximate location of the client system 103. At step 520, the method may identify a content object located within a threshold distance of the approximate location, wherein an augmented-reality map associates the content object with a stored model of a real-world object and specifies a location of the content object on or relative to the stored model of the real-world object. At step 530, the method may obtain an image from a camera of the client system 103. At step 540, the method may identify, in the image, a target real-world object that matches the stored model of the real-world object. At step 550, the method may determine a content object location based on a location of the target real-world object and the location of the content object on or relative to the model of the real-world object. At step 560, the method may display the content object at the content object location.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for displaying content in association with real-world objects including the particular steps of the method of FIG. 5, this disclosure contemplates any suitable method for displaying content in association with real-world objects including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

FIG. 6 illustrates an example network environment 600 associated with a social-networking system. Network environment 600 includes a client system 630 (which may correspond to the client system 103), a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Social Graphs

Figure 7:
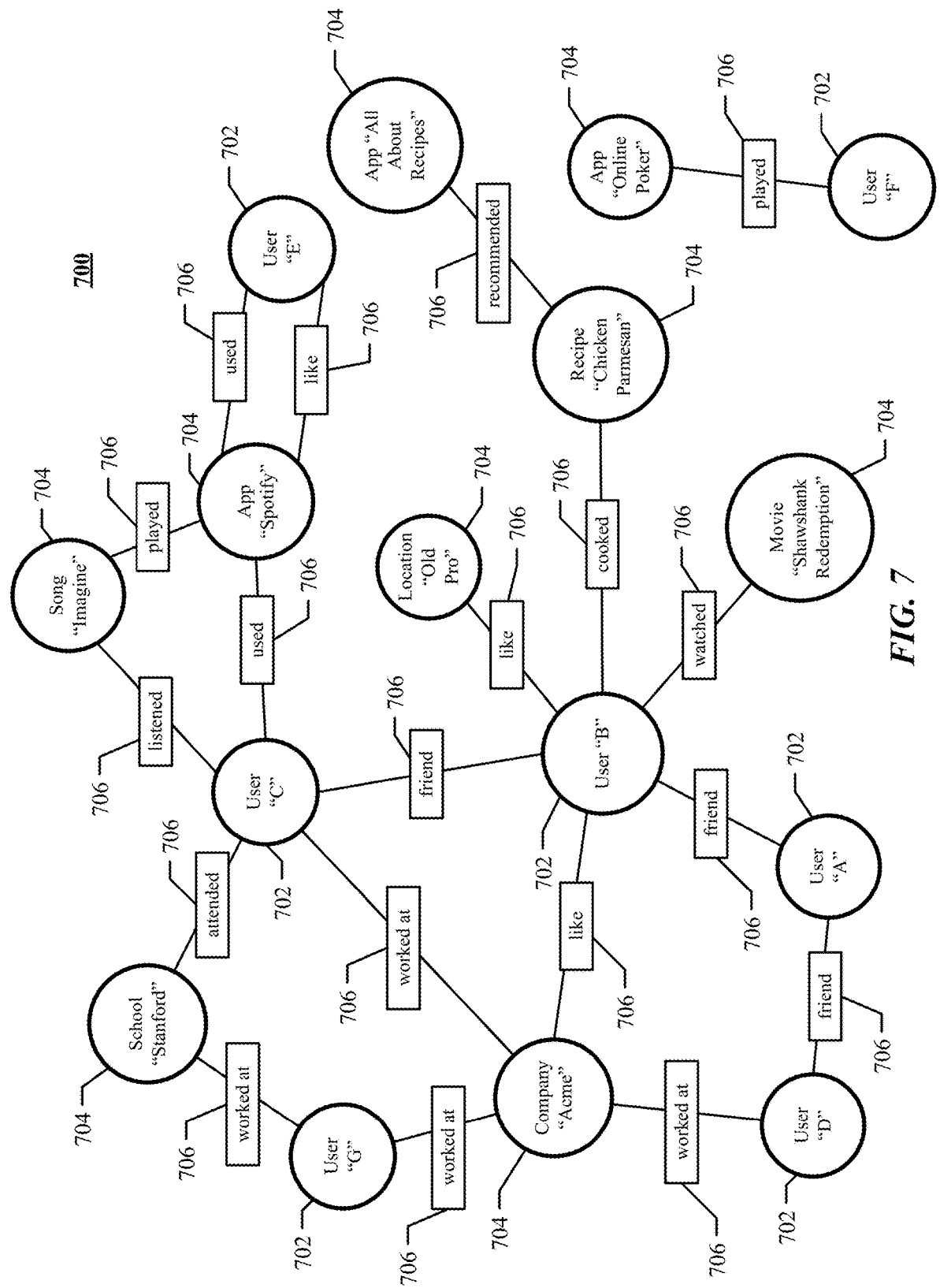
FIG. 7 illustrates an example social graph.

FIG. 7 illustrates example social graph 700. In particular embodiments, social-networking system 660 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular embodiments, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 660 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 660 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704.

In particular embodiments, social-networking system 660 may store an edge 706 in one or more data stores. In particular embodiments, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Advertising

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 660). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 660 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 660) or RSVP (e.g., through social-networking system 660) to an event associated with the advertisement. In addition or as an alternative, an advertisement may include social-networking-system content directed to the user. As an example and not by way of limitation, an advertisement may display information about a friend of the user within social-networking system 660 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular embodiments, privacy settings may allow users to opt in or opt out of having their actions logged by social-networking system 660 or shared with other systems (e.g., third-party system 670). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 662 may be authorization/privacy servers for enforcing privacy settings. In response to a request from a user (or other entity) for a particular object stored in a data store 664, social-networking system 660 may send a request to the data store 664 for the object. The request may identify the user associated with the request and may only be sent to the user (or a client system 630 of the user) if the authorization server determines that the user is authorized to access the object based on the privacy settings associated with the object. If the requesting user is not authorized to access the object, the authorization server may prevent the requested object from being retrieved from the data store 664, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 8:
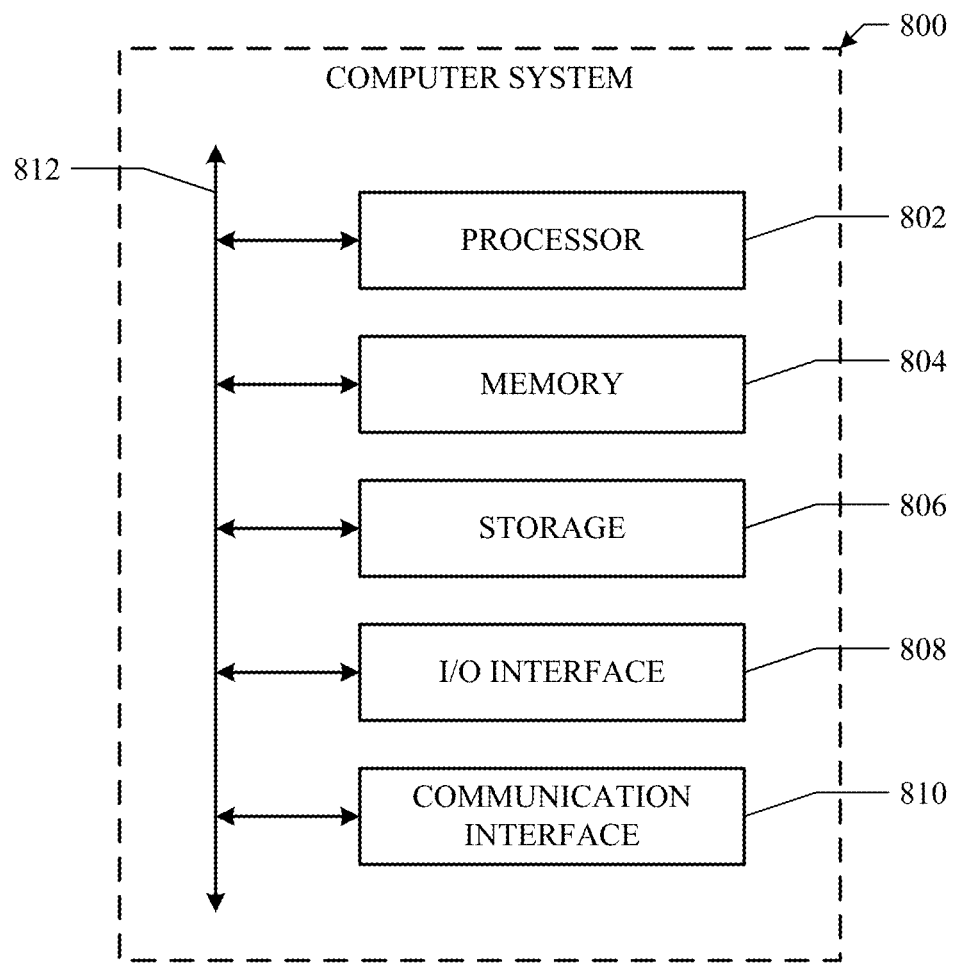
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
 by a computing device, determining, using one or more location sensors of the computing device, an approximate location of the computing device;
 by the computing device, accessing an augmented-reality map associated with a geographic area that comprises the approximate location of the computing device, wherein the augmented-reality map specifies that the geographic area contains one or more predetermined regions defined by corresponding three-dimensional models;
 by the computing device, identifying, using the augmented-reality map, a real-world object located in at least one of the predetermined regions;
 by the computing device, identifying, using the augmented-reality map, a content object associated with the real-world object, wherein the augmented-reality map associates the content object with a stored model of the real-world object and a stored model of the content object, and specifies a location of the stored model of the content object relative to the stored model of the real-world object;
 by the computing device, obtaining an image from a camera of the computing device;
 by the computing device, identifying, in the image, a target real-world object that matches the stored model of the real-world object;

by the computing device, determining, using a tracking algorithm, a location of the real-world object relative to the computing device;

by the computing device, determining a content object location based on the location of the target real-world object relative to the computing device and the location of the stored model of the content object relative to the stored model of the real-world object; and by the computing device, displaying the content object at the content object location.

2. The method of claim 1, wherein the augmented-reality map associates the one or more content objects with coordinates of locations within the one or more predetermined regions defined by corresponding three-dimensional models.

3. The method of claim 1, wherein the one or more predetermined regions comprise one or more rooms in one or more buildings.

4. The method of claim 1, wherein identifying, using the augmented-reality map, a content object associated with the real-world object comprises searching the augmented-reality map for one or more content objects having associated locations within a threshold distance of the approximate location, wherein the threshold distance is associated with the content object.

5. The method of claim 4, wherein the threshold distance is based on an accuracy level of the location sensors.

6. The method of claim 1, wherein the target real-world object matches the stored model of the real-world object when a plurality of target feature points on the target real-world object correspond to a plurality of model feature points associated with the stored model of the real-world object.

7. The method of claim 6, wherein the target feature points correspond to the model feature points when the target feature points represent the same shape as the model feature points.

8. The method of claim 6, wherein identifying, in the image, a target real-world object that matches the model of the real-world object comprises:

identifying candidate feature points in the image, wherein the candidate feature points are on edges or corners in the image;

identifying a plurality of the candidate feature points that correspond to the model feature points, wherein the target feature points on the target real-world object comprise the identified plurality of the candidate feature points.

9. The method of claim 1, wherein displaying the content object comprises rendering the content object based on the stored model of the content object.

10. The method of claim 9, wherein displaying the content object comprises superimposing the rendering of the content object over the image at a location in the image based on the location of the target real-world object.

11. The method of claim 1, wherein the location of the stored model of the content object associated with the content object is a location in three-dimensional space and is on a surface of the stored model of the real-world object.

12. The method of claim 1, wherein the determining the content object location comprises:

by the computing device, retrieving, from the augmented-reality map, a content object offset associated with the content object and further associated with the stored model of the real-world object, wherein the content object offset specifies the location of the content object relative to the stored model of the real-world object, and the content object location is based on a sum of the location of the target real-world object and the content object offset.

13. The method of claim 12, wherein the content object offset comprises a three-dimensional vector, and the method further comprises:

by the computing device, transforming the three-dimensional vector based on an orientation of the target real-world object.

14. The method of claim 1, wherein the content object comprises text content, image content, animation content, video content, or a combination thereof.

15. The method of claim 1, further comprising:

by the computing device, receiving a new content object and a name that identifies a real-world object; and by the computing device, storing the new content object in the augmented-reality map in association with a stored model of the real-world object, wherein the stored model of the real-world object is identified based on the name.

16. The method of claim 1, wherein the augmented-reality map is stored on a social-networking system server.

17. A system comprising: one or more processors; and a memory coupled to the processors comprising instructions executable by the processors, the processors being operable when executing the instructions to:

determine, using one or more location sensors of a computing device, an approximate location of the computing device;

access an augmented-reality map associated with a geographic area that comprises the approximate location of the computing device, wherein the augmented-reality map specifies that the geographic area contains one or more predetermined regions defined by corresponding three-dimensional models;

identify, using the augmented-reality map, a real-world object located in at least one of the predetermined regions;

identify, using the augmented-reality map, a content object associated with the real-world object, wherein the augmented-reality map associates the content object with a stored model of the real-world object and a stored model of the content object, and specifies a location of the stored model of the content object relative to the stored model of the real-world object;

obtain an image from a camera of the computing device;

identify, in the image, a target real-world object that matches the stored model of the real-world object;

determine, using a tracking algorithm, a location of the real-world object relative to the computing device;

determine a content object location based on the location of the target real-world object relative to the computing device and the location of the stored model of the content object relative to the stored model of the real-world object; and display the content object at the content object location.

18. The system of claim 17, wherein the augmented-reality map associates the one or more content objects with coordinates of locations within the one or more predetermined regions defined by corresponding three-dimensional models.

19. One or more computer-readable non-transitory storage media embodying software that is operable when executed to:

determine, using one or more location sensors of a computing device, an approximate location of the computing device;

access an augmented-reality map associated with a geographic area that comprises the approximate location of the computing device, wherein the augmented-reality map specifies that the geographic area contains one or more predetermined regions defined by corresponding three-dimensional models;

identify, using the augmented-reality map, a real-world object located in at least one of the predetermined regions;

identify, using the augmented-reality map, a content object associated with the real-world object, wherein the augmented-reality map associates the content object with a stored model of the real-world object and a stored model of the content object, and specifies a location of the stored model of the content object relative to the stored model of the real-world object;

obtain an image from a camera of the computing device;

identify, in the image, a target real-world object that matches the stored model of the real-world object;

determine, using a tracking algorithm, a location of the real-world object relative to the computing device;

determine a content object location based on the location of the target real-world object relative to the computing device and the location of the stored model of the content object relative to the stored model of the real-world object; and display the content object at the content object location.

20. The media of claim 19, wherein the map associates the one or more content objects with coordinates of locations within the one or more predetermined regions defined by corresponding three-dimensional models.

* * * * *